United States Patent [19]
Louth

[11] 3,942,084
[45] Mar. 2, 1976

[54] VIDEO TAPE RECORDER METHOD AND APPARATUS

[75] Inventor: Kenneth Louth, Menlo Park, Calif.

[73] Assignee: International Video Corporation, Sunnyvale, Calif.

[22] Filed: May 2, 1973

[21] Appl. No.: 356,380

Related U.S. Application Data

[63] Continuation-in-part of Ser. No. 285,917, Sept. 1, 1972.

[52] U.S. Cl. ............... 318/138; 318/254; 318/449; 318/327
[51] Int. Cl.² .................. H02P 5/06; H02K 29/02
[58] Field of Search ............ 318/138, 254, 326–328, 318/449

[56] References Cited
UNITED STATES PATENTS

| | | | |
|---|---|---|---|
| 3,622,851 | 11/1971 | Hanada | 318/138 |
| 3,696,277 | 10/1972 | Liska | 318/138 |
| 3,764,869 | 10/1973 | Woodbury | 318/138 |

Primary Examiner—James R. Scott
Assistant Examiner—John J. Feldhaus
Attorney, Agent, or Firm—Limbach, Limbach & Sutton

[57] ABSTRACT

Motor drive and servo systems particularly useful in high quality broadcast video tape recorders. A sine/cosine drive for a brushless DC motor permits high motor efficiency in a system adapted for use in a servo loop. A technique for phase locking a pair of frequency related phase locked control variable signals to a pair of frequency related reference signals, horizontal and vertical sync signals, for example, provides the advantages and precision of closed loop correction at widely variable correction rates. More accurate tape shuttling in a VTR is provided by running a DC motor in a phase locked loop as a synchronous motor and more accurate stopping of the tape is provided by comparing the capstan speed to ground in a closed loop. Improved tape tension control in the head area is provided by a pair of vacuum columns controlled by an error signal derived from the peak-to-peak tension error.

3 Claims, 37 Drawing Figures

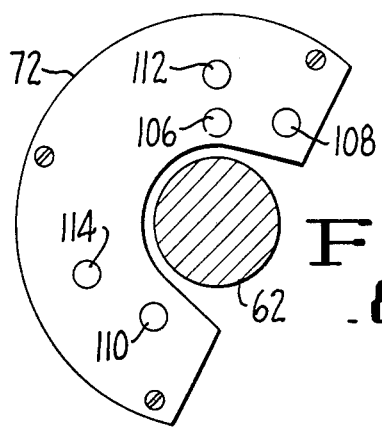
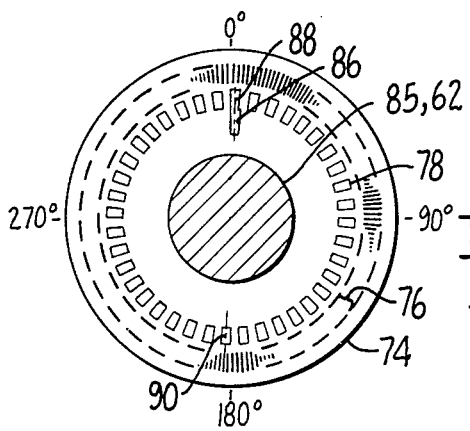
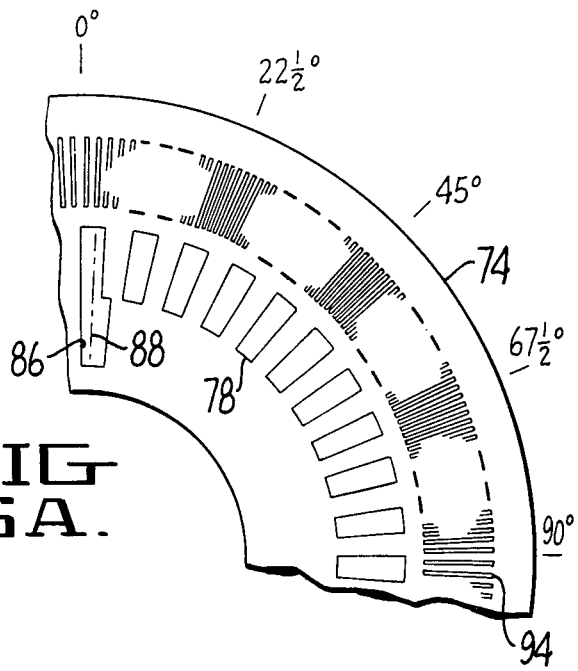
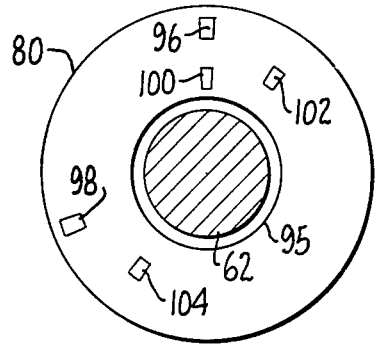
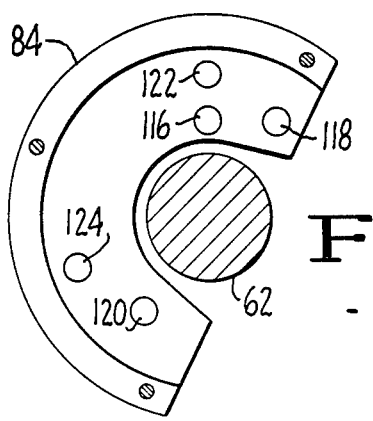
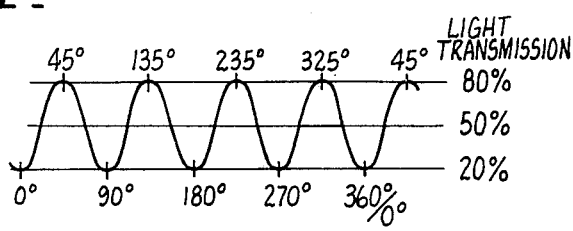

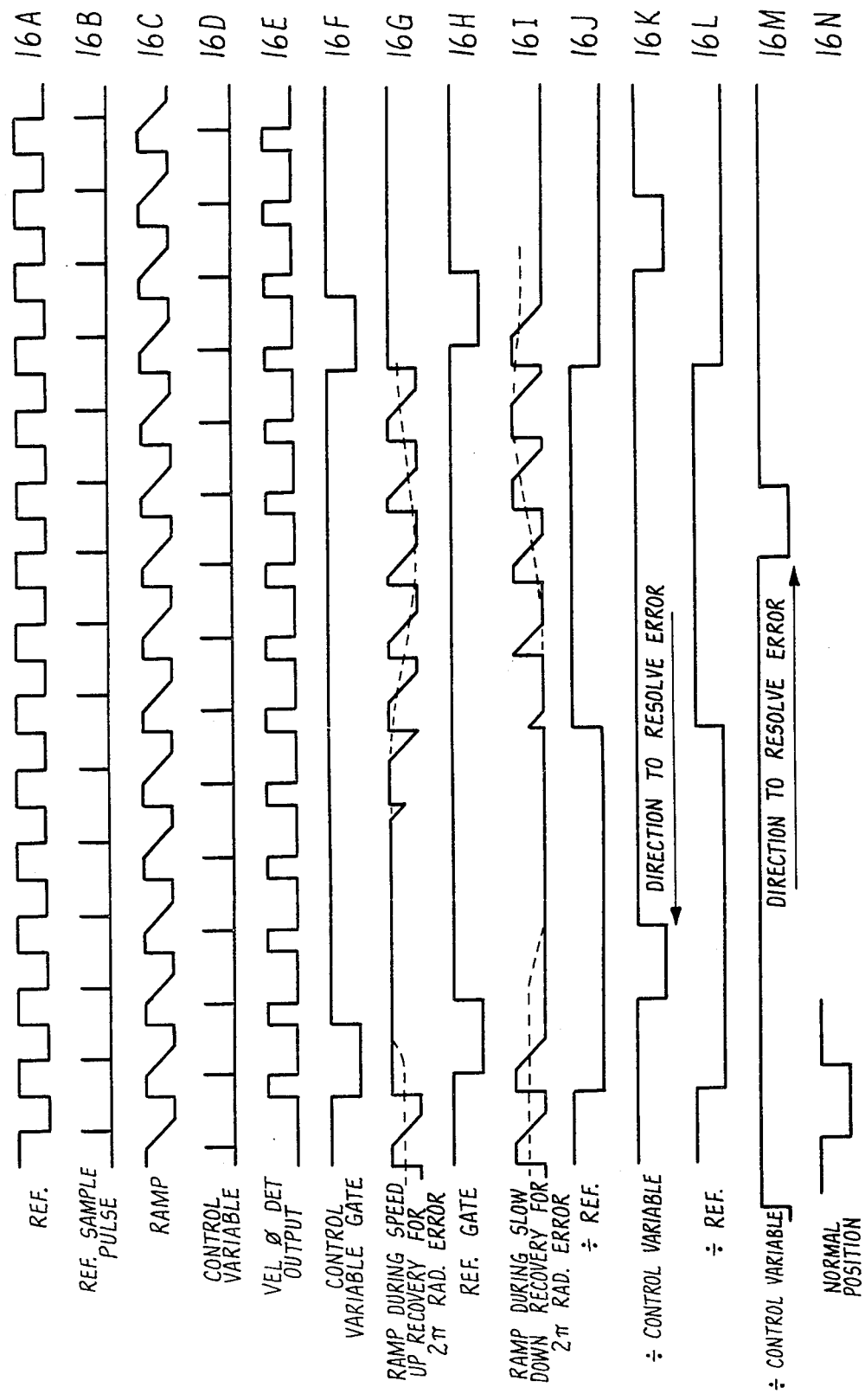

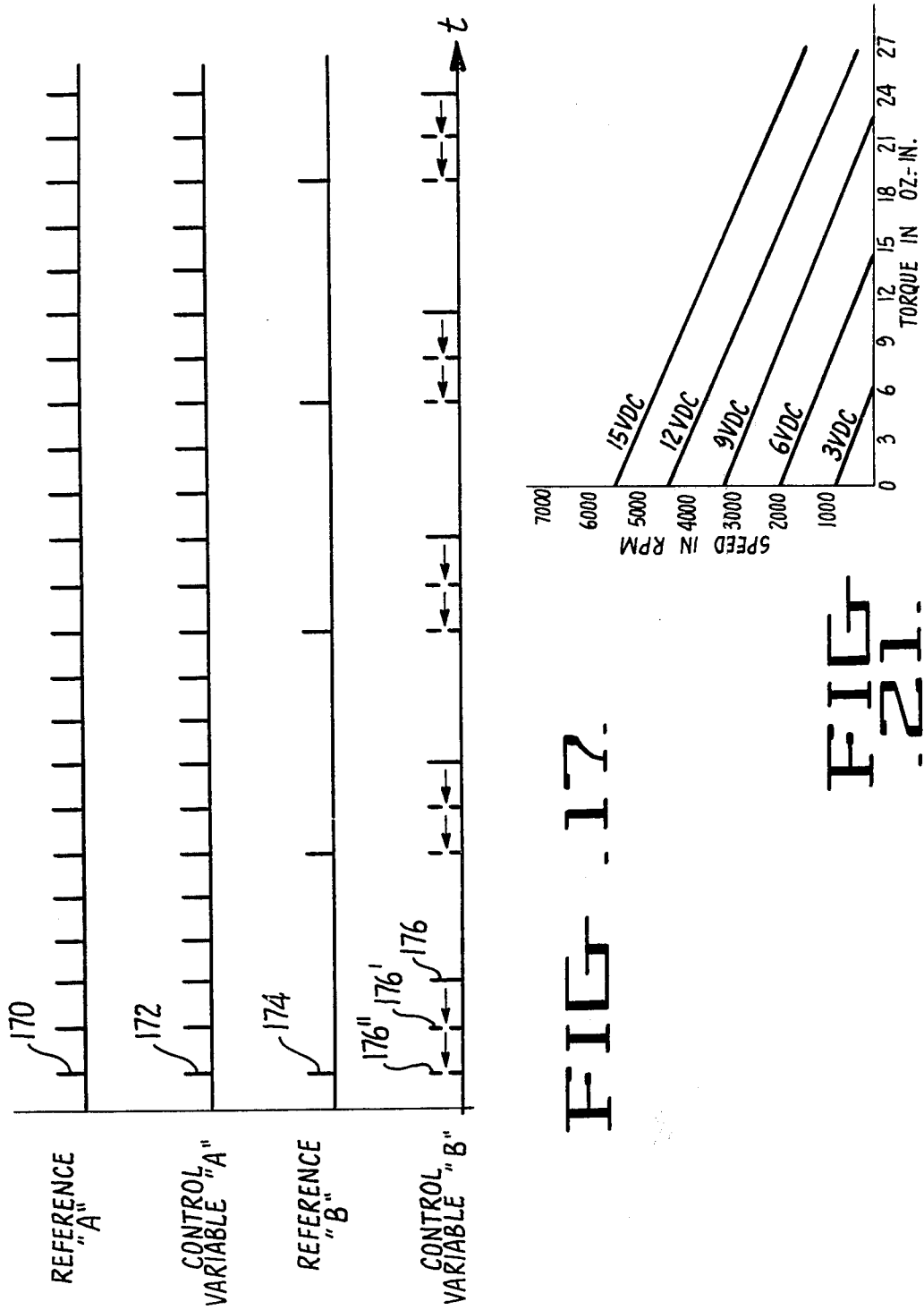

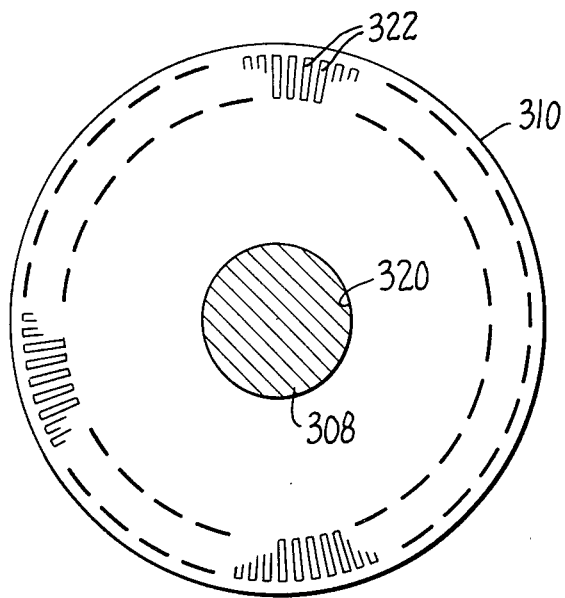
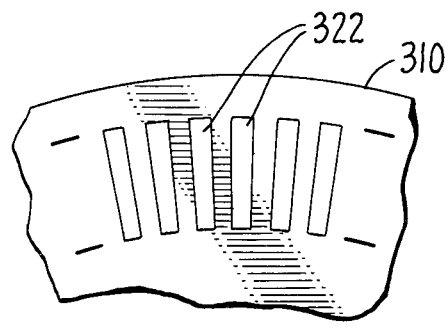
FIG. 22B.
FIG. 22A.
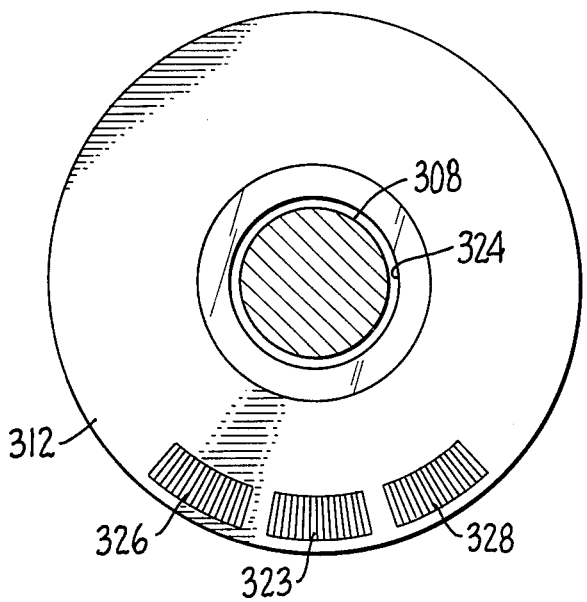
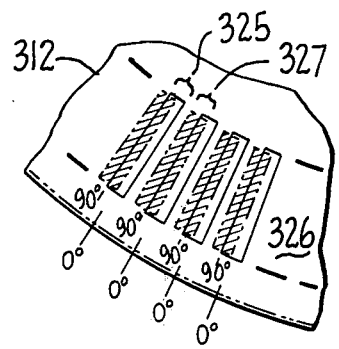
FIG. 23B.
FIG. 23A.
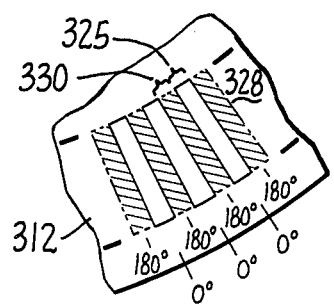
FIG. 23C.

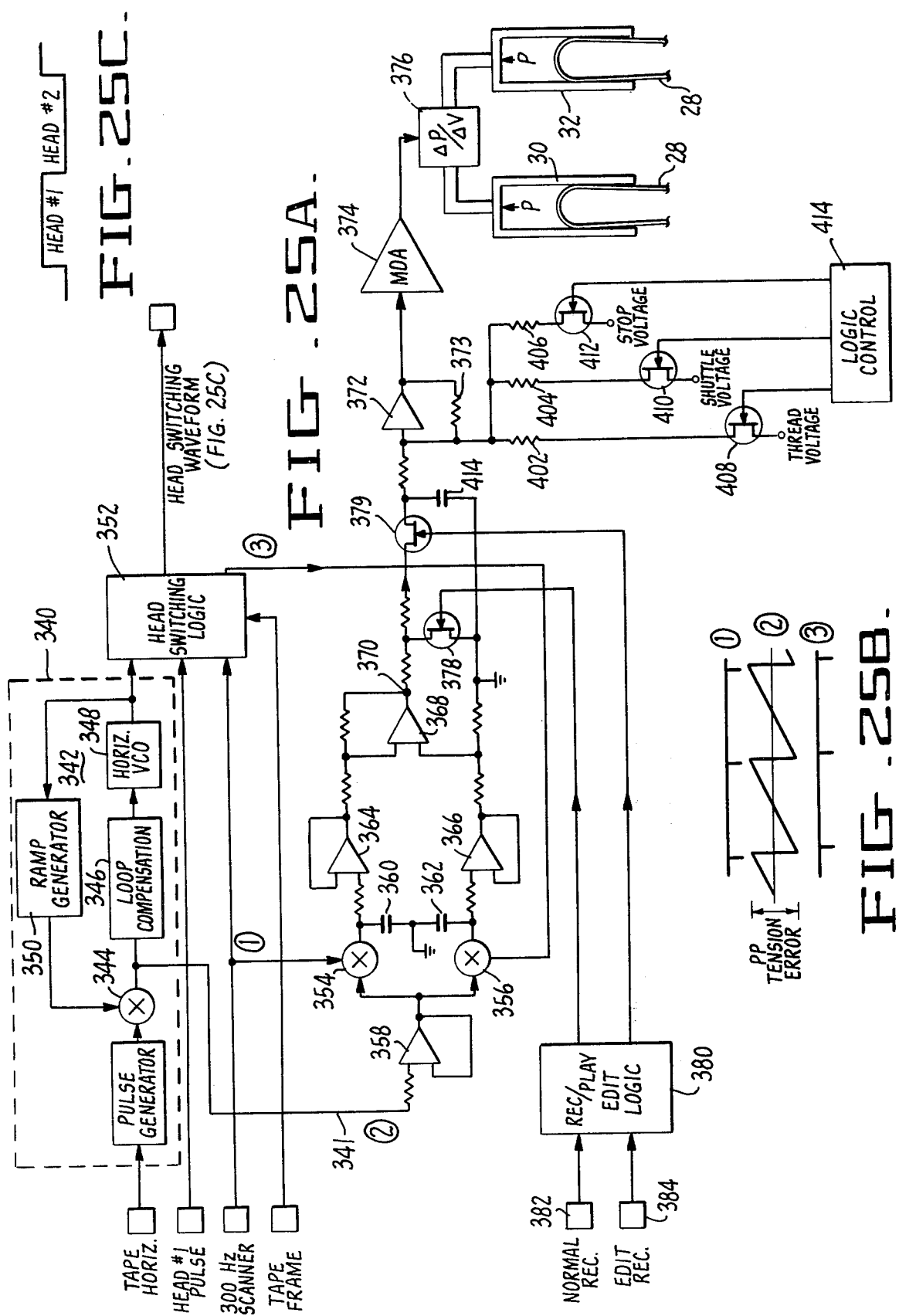

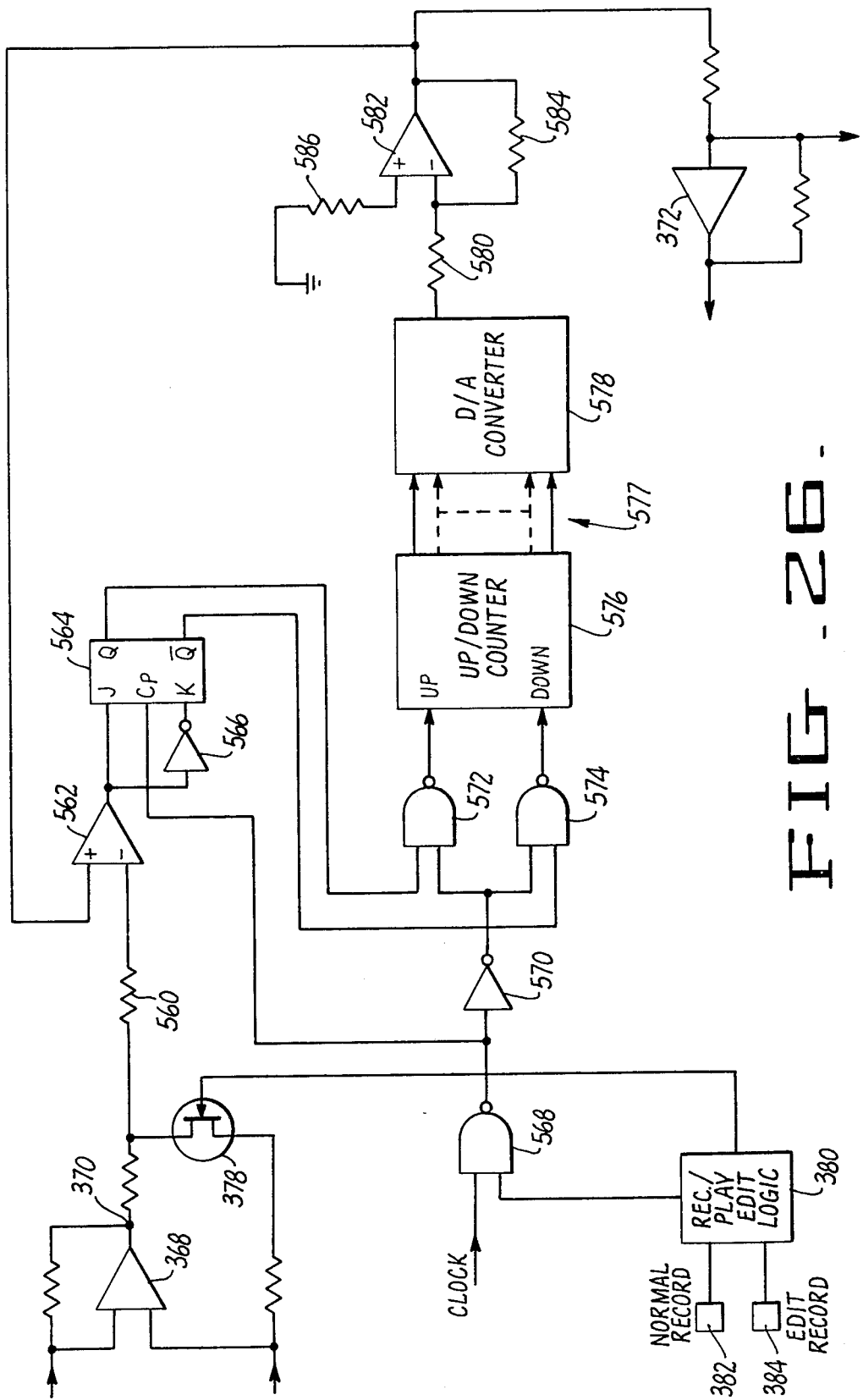

VIDEO TAPE RECORDER METHOD AND APPARATUS

This is a continuation-in-part of application Ser. No. 285,917, filed Sept. 1, 1972.

BACKGROUND OF THE INVENTION

The present invention relates to servo systems and motor drive systems and particularly to such systems when used in a video tape recorder (VTR).

Typically, in a videotape recorder the video heads are carried on a rotating member driven by a motor. In order to carry out various operations of the VTR it is necessary to precisely control the rotation of the motor. While Dc motors are particularly suited to such uses, the means for commutating the motor is a problem particularly if high motor efficiency is desired so that heat generation is minimized near the motor and associated critically dimensioned mechanical elements. Prior art DC motor commutation has included the use of Hall devices which reduce the motor efficiency and various optically commutated approaches which sequentially energize the motor stator windings. However, these prior art approaches do not optimize motor efficiency nor are they easily adapted to applications where control voltages are applied for causing small changes in the motor rotation as is required in synchronizing a VTR.

There are many applications, including synchronizing-generator locking in television studios and the synchronizing of VTR's to external reference timing signals wherein two control variable signals, such as a horizontal line rate synchronizing signal and a vertical (frame or field) rate synchronizing signal (each in frequency and phase lock with each other) are both to be phase locked to two external reference horizontal rate and vertical rate signals. A prior art approach in the generator locking art is to lock the local horizontal to the reference horizontal in a phase locked loop, then to compare the reference vertical and local vertical phase and "slip" the local vertical by increments of horizontal lines until vertical phase lock is achieved. For example, see U.S. Pat. No. 2,720,555 to I. A. Krause. While this approach is acceptable in generator locking because the local vertical is related to the local horizontal in a count down divider chain, it is not applicable to the VTR situation where the local vertical and local horizontal are inherently tied to each other. That is, in order to rephase the local vertical, the local horizontal must also shfit unlike the generator locking case where the local vertical can be moved independently of the local horizontal.

Prior art VTR approaches to this phase locking problem have typically sought to achieve vertical phase lock by developing an analog error signal representing the vertical phase error and using this error signal to provide an open loop steering of the capstan servo loop, hence moving the horizontal and consequently, rephasing the vertical. Such approaches tend to be rather abrupt, imprecise and uncontrolled because they do not retain a closed loop situation during the correction step or steps.

An ancillary problem in VTR's is the precise control of the videotape in shuttle and stop modes. In manual operation and particularly in automatic or semiautomatic search modes where it is desired to rapidly find and park at a particular address on the tape the prior art VTR's have provided imprecise open loop shuttling and stopping.

A further problem in high quality VTR's is the introduction of tape tension correction in the video head area. Due to contraction or expansion of the videotape between recording and playback, which often may be months or years under widely variant temperature and humidity, it it necessary to provide a mechanical stretching across the head area so that the original tape dimensions with respect to the recorded signals are duplicated as closely as possible. The prior art has made this correction by driving a flywheel type oscillator with the off-tape horizontal sync signals and generating an error signal by comparing the instantaneous off-tape horizontal signals with the oscillator output once at the head switch time. This single sample approach has the disadvantage of permitting common mode DC errors to decrease the accuracy of the correction signal. Moreover, the prior art error signals have typically been used to control electromagnetic means on one side of the tape head area acting against the capstan on the other side of the tape head area, thus requiring a relatively high friction tape path.

SUMMARY OF THE INVENTION

These and other problems arising in prior art techniques are solved according to the teachings of the present invention.

A motor drive for brushless DC motors is provided having sine wave drive including an optical disc with light sources and sensors generating sine and cosine signals which modulate the drive current to the motor phases. A complete sine wave cycle is provided on the disc for each pair of motor poles.

The sine and cosine track outputs are amplified to drive the stator windings so producing a rotating stator vector which is always in advance of the rotor vector by a fixed angle whatever the acceleration or velocity. The speed is controlled by varying the gain of the drive amplifiers.

A further embodiment of the motor drive for brushless DC motors employs any means such as a simple disc for providing a signal related to the motor rotor angular position. From that signal the sine/cosine drive information is electronically derived. Also, the position information can be used to control the motor in a closed loop position servo arrangement. Digital information can also be derived from the rotor angular position signal. A high motor efficiency is achieved permitting the substantial heat loss to be dissipated in the motor drive amplifiers which may be located away from heat sensitive mechanisms driven by the motor. The arrangement also facilitates the inclusion of the motor and drive circuitry in a servo loop in which the motor may be advantageously controlled for resolving phase errors, for example.

A "missed pulse" approach for bringing a pair of phase locked control variables both into phase lock with a pair of reference signals is provided. Phasing of the lower frequency control variable is provided by causing the main phase locked loop, which locks the higher frequency control variable to the higher frequency reference signal to rephase itself by incrementally slowing down or speeding up in one or more steps of $2\pi$ radians of the loop carrier frequency. The rate of correction is variable from an extremely slow rate up to a maximum determined by the loop bandwidth. The correction time is thus completely predictable and repeatable for a given phase error and the correction is accomplished using the loop itself with its inherent stability. While applicable to generator locking, the approach is particularly useful in videotape recorders in controlling the phasing of video head scanners or tape capstans. Thus, for example, the phase locked loop may be used to bring the tape horizontal into phase lock with an external reference horizontal signal, such as the television studio sync. However, there are many phases of the horizontal sync that the tape vertical sync may be related to and it would be pure chance for the tape vertical sync to be in phase lock with the reference vertical sync. Hence, single horizontal pulses are either added or subtracted from the loop one at a time, causing it each time momentarily to speed up or slow down (a $2\pi$ radian change of the carrier frequency) and relock at a different horizontal phase until the vertical phase error is resolved.

In order to provide a more precise control of tape shuttling and stopping, a unique approach is provided in the tape capstan drive system. While a DC motor is used, it is effectively converted to a synchronous motor by a phase locked loop which receives variable DC control voltages as references in order to provide precise speed control of the motor and capstan over a wide speed range. As zero speed is approached, a ground reference is provided in the motor loop to cause active stopping of the capstan. The stopping point is predictable and once reached the closed loop provides a high mechanical resistance to capstan movement.

An improved tape tension technique is provided by deriving the tension error signal from the peak-to-peak error occurring at the head switches. That is, the difference between the off-tape and flywheel oscillator horizontal is looked at both before and after the head switch to generate a difference signal, thus eliminating common mode errors. Further, in order to facilitate a low friction tape path, the tension correction is mechanically introduced by varying the vacuum in vacuum columns located on each side of the video head area.

These and other advantages and features of the present invention will be recognized more fully as the detailed description of the embodiments, claims and accompanying drawings are read and understood. It will be understood that although the invention is described with respect to a helical scan VTR that it is in most respects applicable to other type VTR's and moreover is applicable to environments other than in VTR's.

BRIEF DESCRIPTION OF THE DRAWINGS

FIG. 6A is a plan view of the rotating tachometer disc used in the scanner assembly of FIG. 3.

FIG. 6B is an enlarged section of the tachometer disc of FIG. 6A.

FIG. 6C is a sinusoidal waveform generated by the tachometer disc of FIG. 6A.

FIG. 7 is a plan view of the stationary tachometer disc used in the scanner assembly of FIG. 3.

FIG. 8 is a plan view of a light source holder used in the scanner assembly of FIG. 3.

FIG. 9 is a plan view of a light sensor holder used in the scanner assembly of FIG. 3.

FIGS. 16A-N are a series of waveforms useful in understanding FIG. 15.

FIG. 17 is a timing diagram useful in understanding FIG. 15.

FIG. 21 is a graph useful in understanding the operation of the capstan motor.

FIG. 22A is a plan view of the rotating capstan tachometer disc.

FIG. 22B is an enlarged detail of a portion of FIG. 22A.

FIG. 23A is a plan view of the stationary tachometer disc.

FIG. 23B is an enlarged detail of a portion of FIG. 23A.

FIG. 23C is an enlarged detail of a further portion of FIG. 23A.

FIG. 25A is a block diagram of the tape tension servo according to the present invention.

FIG. 25B is a set of waveforms useful in understanding FIG. 25A.

FIG. 26 is a schematic, partially block diagram of a modified embodiment of a portion of FIG. 25A.

DESCRIPTION OF THE PREFERRED EMBODIMENTS

Figure 1:
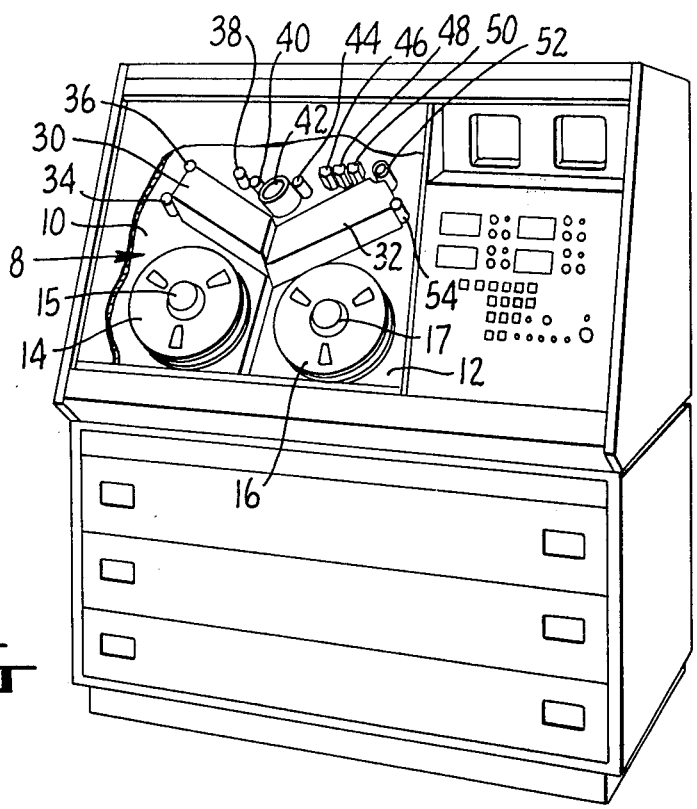
FIG. 1 is a perspective view of a videotape recorder console in which the servo and motor drive systems according to the present invention may be used.
Figure 2:
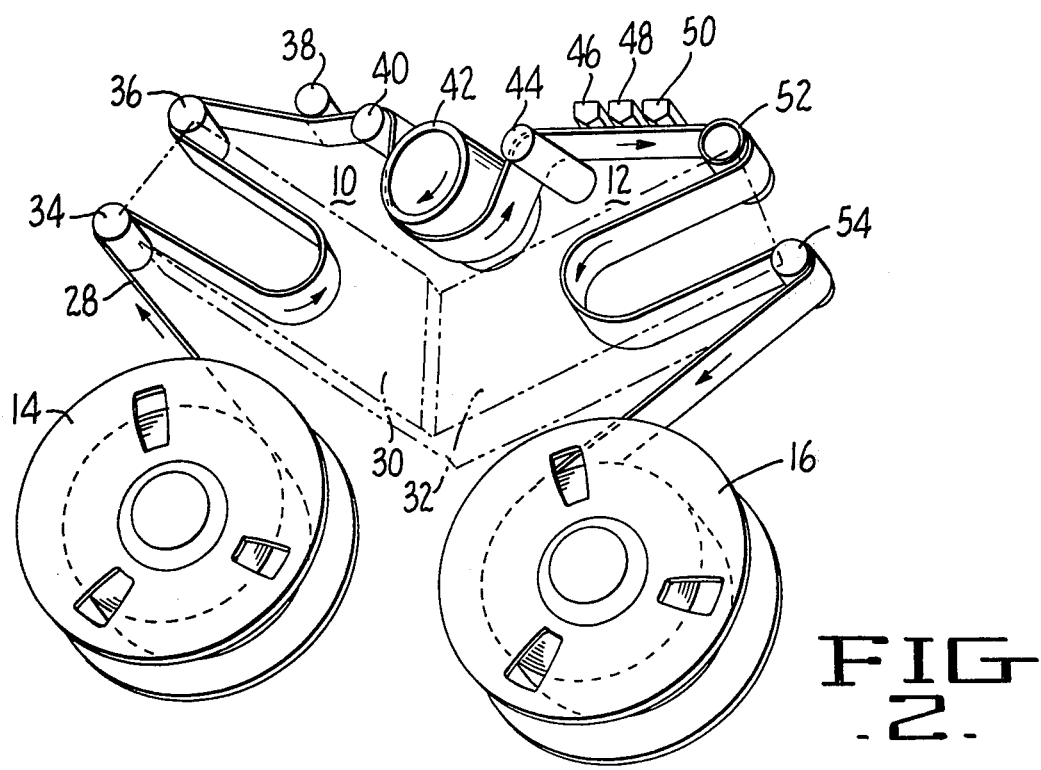
FIG. 2 is a perspective view of a portion of the videotape recorder deck or transport assembly shown in FIG. 1.

Referring now to FIGS. 1 and 2, perspective views of a video tape recorder deck or transport assembly 8 which desirably includes the servo systems according to the present invention are shown. The assembly includes an upper deck plate portion 10 and a lower deck plate portion 12: due to the nature of the helical scan wrap around scanner assembly 42, the supply and take up portions of the deck assembly 8 are displaced in height. A supply reel 14 is held by a hub 15 fixed to the upper deck plate 10. Video tape 28 from supply reel 14 passes around an air bearing guide post 34 and loops into a first vacuum column 30. Tape 28 comes out of vacuum column 30 around a further air bearing guide post 36 to a scanner assembly air bearing guide post 40. A full tape width bulk erase head 38 is located between posts 36 and 40 so as to contact the tape 28. The scanner assembly 42, described in further detail below, along with the input and output air bearing guide posts 40 and 44 form an angle of about 19.55° with the plane of deck plates 10 and 12 in order to provide the desired video track angle of about 19.55°.

Tape 28, guided by posts 40 and 44 forms a wrap of about 188.57° around the scanner assembly 42. An air bearing is also provided around the scanner assembly 42. A vacuum collar (not shown) separates the tape 28 from the scanner assembly 42 when the tape is shuttled at high speeds. After passing around post 44, the tape 28 contacts three record/playback head stacks 46, 48 and 50 as described further in connection with FIGS. 9A, 9B and 9C. Head stacks 46, 48 and 50 carry various audio, audio cue, address code, video confidence and erase heads.

Tape 28 then passes around capstan 52, loops into a second vacuum column 32, and passes around a further air bearing guide post 54 to take up reel 16 held by hub 17 on the lower deck plate 12. Vacuum columns 30 and 32 cooperate in tandem to provide a variable vacuum pull on each side of the scanner assembly 42, thus permitting a variable tape tension as explained further below. The entire tape path has very low friction due to the use of air bearing members and the use of vacuum columns for tension control. Further, details of the deck assembly including the vacuum columns 30 and 32 and the scanner assembly 42 are disclosed in a copending application of Frank S. C. Mo and Vernon R. Natwick, entitled Magnetic Tape Transport System, Ser. No. 285,923, filed Sept. 1, 1972 and assigned to the same assignee as this application and in a continuation-in-part application of said Ser. No. 285,923 application filed on or about Apr. 25, 1973 and assigned to the same assignee as this application. Further details of an improved high quality broadcast helical scan VTR format usable in the VTR described in connection with the present invention are disclosed in a copending application of Barrett E. Guisinger, entitled Helical Scan Wide Band Tape Recorder Apparatus and Method, Ser. No. 285,922, filed Sept. 1, 1972 and assigned to the same assignee as this invention.

Figure 3:
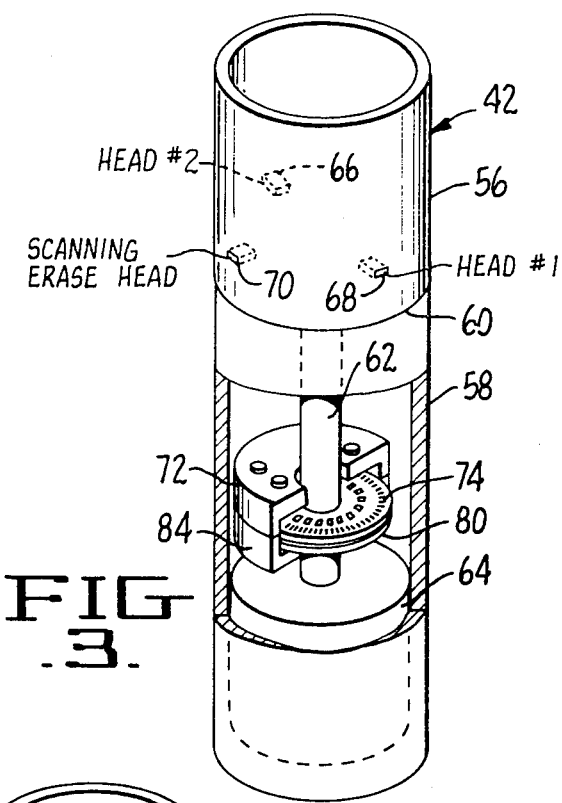
FIG. 3 is a partially cut-away schematic perspective view of a scanner assembly used in the transport assembly of FIG. 2.
Figure 5:
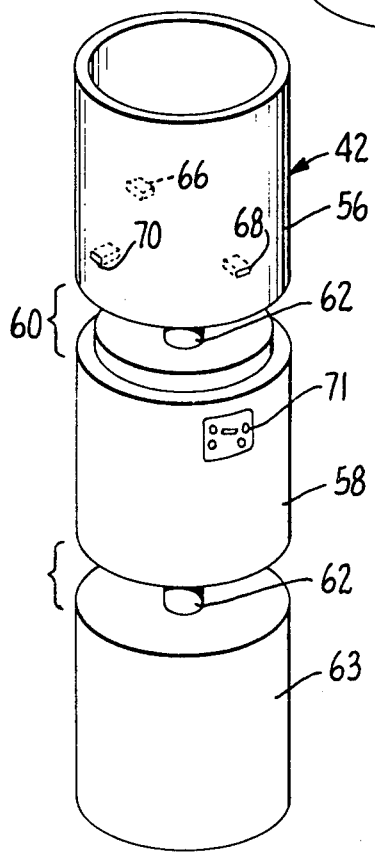
FIG. 5 is a further schematic perspective view of the scanner assembly of FIG. 3, showing its major subassemblies and the location of the control track head.
Figure 4:
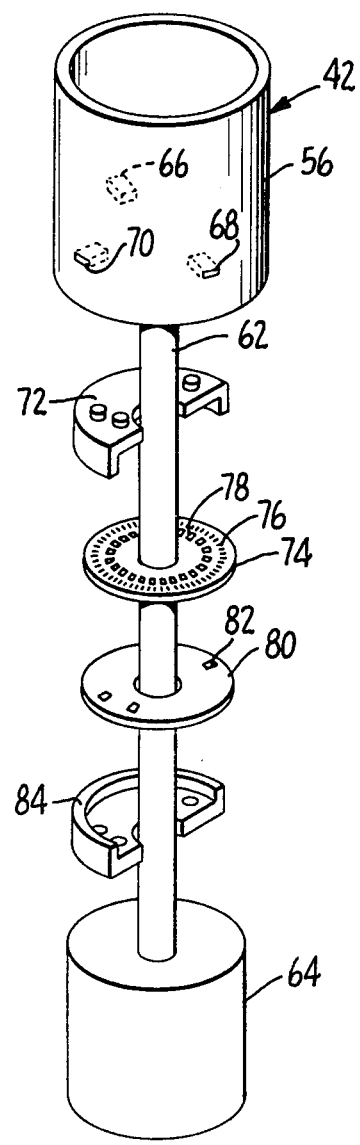
FIG. 4 is an exploded perspective view of FIG. 3.

Referring now to FIGS. 3, 4 and 5, the scanner assembly 42 is shown in greater detail, although schematically, omitting mechanical details not necessary to the understanding of the present invention.

Scanner assembly 42 comprises a stationary drum portion 58 that is fixed to the deck plates 10 and 12. A housing 63 holds a motor 64, described in greater detail hereinafter, driving a central shaft 62 that carries a rotating drum portion 56 which is spaced apart from the stationary drum 58 by a small gap 60. Drums 56 and 58 are both cylindrical and their outer surface dimensions are machined for close tolerance with each other, although due to the configuration of the scanner assembly 42, the tolerance is not as exacting as would typically be required because about 80% of the tape wrap is around the upper rotating drum 56.

Three heads, a first video head 66, a second video head 68 and a scanning erase head 70, are carried in the upper drum in a single plane perpendicular to the shaft 62. The tape contacting tips of the heads extend slightly beyond the drum periphery in order to contact the tape 28 when it is wrapped around the scanner assembly 42. The scanning erase head is dimensioned to erase two video tracks per revolution. Video heads 66 and 68 are hot pressed ferrite type having frequency responses well beyond 12 MHz.

A rotating optical disc 74 is fixed to shaft 62 and therefore rotates in synchronism with the rotating drum 56. Disc 74 carries an outer set of indicia 76 for use in driving the motor, and an inner set of indicia 78 to provide tachometer pulses and an indicator of the video head 66 (head "1") position, as will be explained further below in connection with FIGS. 6A, 6B and 6C.

A static (stationary) disc having slots 82 is positioned in juxtaposition below the rotating disc 74. The slots operate in conjunction with the rotating disc 74 and sets of light sources and light sensors to provide desired signals. Further details of the static disc 80 are set forth in the discussion of FIG. 7.

A horseshoe shaped stationary member 72 is located adjacent and above the rotating disc 74. Member 72 holds a plurality of light sources as will be shown in further detail in FIG. 8.

A second horseshoe shaped stationary member 84 is located adjacent and below static disc 80. Member 84 holds a plurality of light sensors as will be shown in further detail in FIG. 9.

Referring now to FIGS. 6A and 6B, the details of the rotating optical disc 74 are shown in greater detail. Disc 74 is circular with a central circular cutout 85 for drive shaft 62. Except for the slots to be described, the disc 74 is opaque to light. A series of forty trapezoidal slots or optically clear areas comprising indicia 78 are equally spaced around the disc. Each area 78 is of the same size and is located the same radial distance along the disc 74. One area 78 has a further slot or clear area 86 abutting it. Slot 86 is used to provide an indication of the video head 66 (head "1") position. Disc 74 is precisely aligned with the rotating drum 56. Line 88 indicates the centerline and gap of the video head 66 (head "1"). One hundred and eighty degrees away, line 90 indicates the centerline and gap of the video head 68 (head "2"). The precise 180° separation of the two video heads is critical in order to avoid "dihedral" errors in record and playback.

The further set of indicia 76, located outside indicia 78 are intended to provide a sinusoidal light transmission. The sinusoidal waveform results from providing narrow slots 94 between a pair of radial distances on the disc 74 with the adjacent spacing between slots 94 varied so that the light transmission varies in the desired sinusoidal pattern. Although not shown for clarity in FIG. 6B, the slots 94 are continuously located around the disc with their spacing varied according to the desired sinusoidal waveform shown in FIG. 6C. Thus, the mark-space ratio defined by slots 94 produces a sine wave output as the disc 74 rotates.

In FIG. 6, the static disc 80 is shown in greater detail. The disc is circular and substantially identical in diameter to disc 74. A central circular aperture 95 is provided for mounting. The details of mounting discs 80 and 74 are omitted as nonessential to the invention's understanding. Disc 80 is opaque to light and a pair of viewing apertures 96 and 98 located radially to line up with the slots 94 in disc 74 provide a look at sine and cosine variations in the slots 94 because the viewing apertures 96 and 98 are spaced apart by 112.5°, the physical distance necessary to provide a 90° electrical spacing for simultaneous sine and cosine readings from a single sine wave track. A viewing aperture 100 is located to read the area 86 indicating the video head 66 (head 1). A pair of viewing apertures 102 and 104, located 180° apart are positioned to read the slots 78.

FIGS. 8 and 9 show members 72 and 84, respectively, in greater detail. Member 72 holds a plurality of light sources in the correct position in relation to the fixed disc 80, the rotating disc 74, and the locations of the light sensors in member 84 so that signals are provided corresponding to:

1. each pass of the slot 86 over viewing area 100 to give a video head 66 (head 1) pulse,
2. a pair of tachometer signals at 40 times the rotating disc 74 rate as slots 78 pass over viewing areas 102 and 104, and
3. simultaneous sine and cosine signals as the sine wave slots 94 pass over viewing areas 96 and 98. It will be apparent that many types of light sources and sensors can be used, for example, light emitting diodes (LED's) and phototransistors. LED 106 cooperates with phototransistor 116 to provide a head 1 pulse once every rotation of disc 74; LED's 108 and 110 cooperate with phototransistors 118 and 120, respectively, to provide two pairs of tachometer pulses at 40 times the disc 74 rotation rate; LED's 112 and 114 cooperate with phototransistors 122 and 124 to provide the sine and cosine signals.

A control track record and playback head 71 is located on the fixed drum 58 in order to contact the tape 28 while wrapped around scanner assembly 42, thus reducing errors due to tape stretch and mechanical tolerances when the control track head is separated a distance from the video head assembly.

Figure 10:
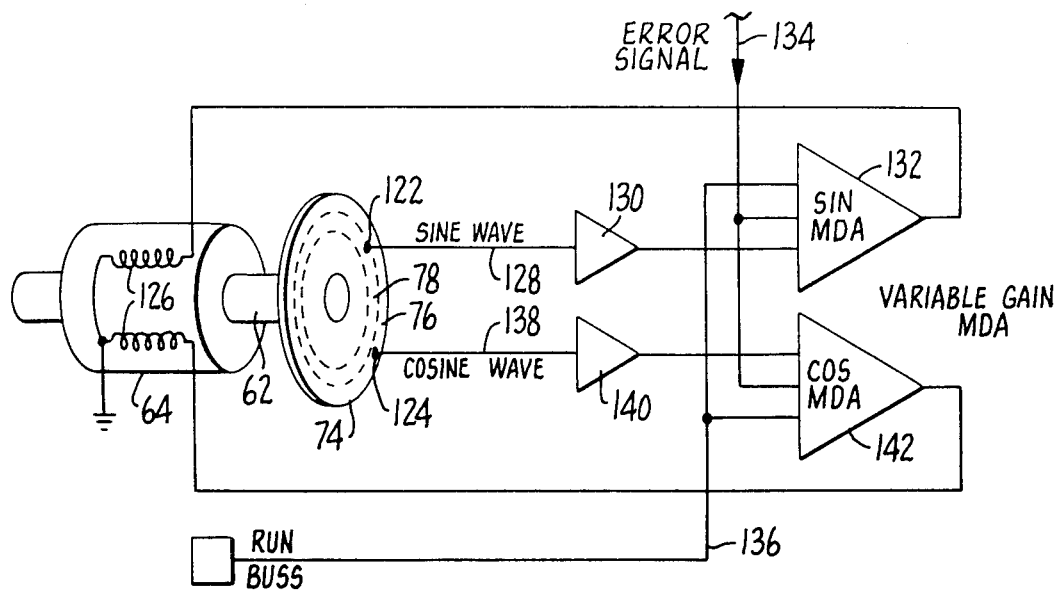
FIG. 10 is a schematic block diagram of a motor drive circuit for a brushless DC motor.

Referring now to FIG. 10, a schematic block diagram of the motor drive circuit for motor 64 is shown. Motor 64 is a two-phase, 8 pole brushless DC motor. The details of such a motor per se are well known in the art and form no portion of the invention. A further brushless DC motor drive circuit which can be also used with motor 64 is disclosed hereinafter with FIG. 27 and the accompanying description.

The sine and cosine signals from phototransistors 122 and 124 on lines 128 and 138 are respectively applied to preamplifiers 130 and 140 whose outputs are connected to respective inputs of variable gain motor drive amplifiers (MDA's) 132 and 142. Each amplifier also receives an error signal on line 134 from further circuitry described hereinafter. A run buss 136 is also connected to each amplifier input. The output of sine MDA is applied to one of each pair of windings 126 and the output of the cosine MDA is applied to the other of each pair of windings 126. The other end of each winding 126 is grounded.

The motor rotor (not shown) has its magnetic poles (not shown) aligned so as to generate the sine and cosine output in correspondence with the pole position of the rotor. Thus no switching commutation scheme is required nor are Hall devices, which reduce motor efficiency, required. The motor torque is defined by a function of $\sin^2 Wt + \cos^2 Wt$ which is equal to 1 (i.e. D.C.).

Since the optical disc 74 has resolution down to zero speed, the motor is self-starting.

By providing a brushless DC motor with a sine/cosine drive the motor efficiency is greatly increased over typical prior art approaches (to about 80% efficiency).

Thus the motor dissipates substantially less heat which is a critical factor in many applications such as in a video tape recorder where heat producing elements are undesirable due to their effect on tight mechanical tolerances. Instead of dissipating large amounts of power in the motor, power is dissipated in the MDA's 132 and 142 which can be located away from critical components and which can be cooled more easily.

The present arrangement also provides excellent peak torque characteristics and linear motor transfer function.

Figure 11:
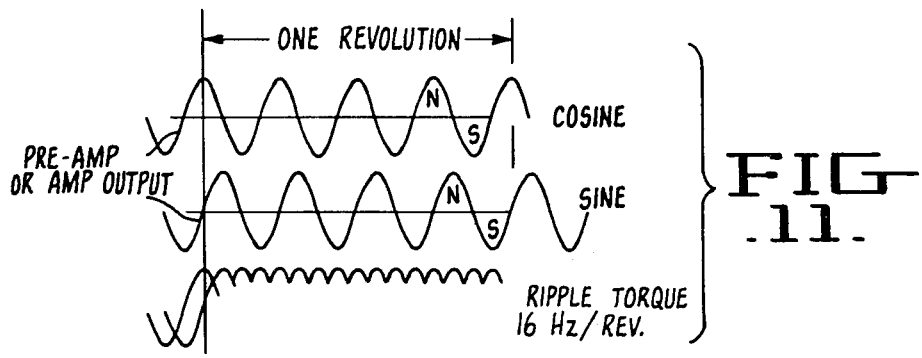
FIGS. 11–14 are waveforms useful in understanding FIG. 10.

FIG. 11 shows the sine and cosine waveforms at the preamplifiers (130 and 140) or MDA's (132 and 142) indicating the north and south magnetic pole rotor action, and the ripple torque waveform which is 16HZ per revolution (2 phase × 8 poles).

Figure 12:
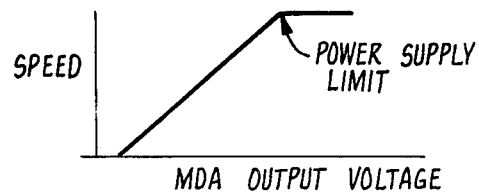

FIG. 12 shows a plot of speed versus MDA (132 and 142) output voltage. Speed increases linearly until the limit of the MDA power supply is reached.

Figure 13:
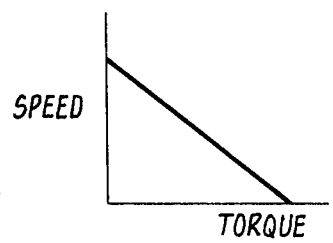

FIG. 13 shows one of a parallel family of curves of speed versus torque of the motor for a particular voltage. The torque is proportional to current; speed is proportional to voltage. When used in a video tape recorder, the motor provides substantial torque at the operating speed which may be, for example, 150Hz.

Figure 14:
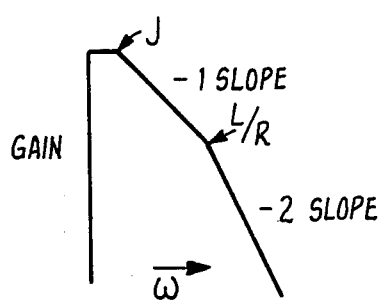

FIG. 14 shows a plot of the linear transfer function of motor in terms of gain versus frequency. The corner frequencies are shown at J and L/R represent the mechanical and electrical time constants, respectively. The curve slope is −1 from J to L/R and −2 beyond L/R.

The FIGS. 12–14 show the linearity of the motor system and confirm that the motor acts as a DC motor.

Figure 15:
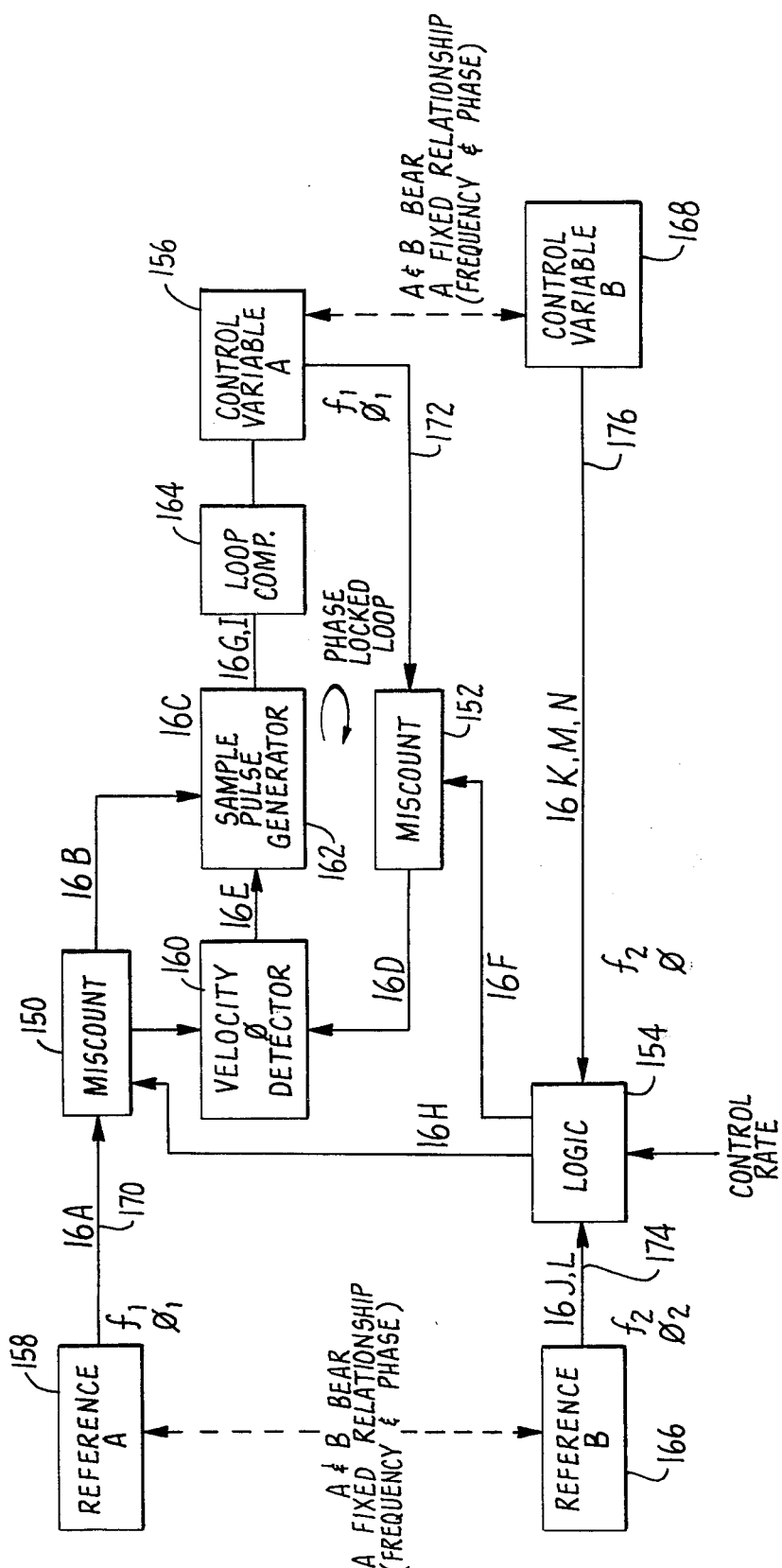
FIG. 15 is a general block diagram of the "miscount" phasing system according to the present inventinn.

FIG. 15 shows in block diagram form a circuit and method useful for bringing a control variable signal "B" into frequency and phase lock with a reference signal B where the control variable signal B bears a fixed frequency and phase relationship to a further control variable signal "A" that is in frequency and phase lock with a further reference signal A, reference signal A bearing a fixed frequency and phase relationship to reference signal B. An understanding of this general circuit approach will be helpful in subsequent descriptions of the scanner and capstan servo loops herein. Moreover, it will be apparent that this circuit is applicable not only in video tape recorders but also in many other applications including "gen. locking" procedures in television studios.

Throughout this application, reference is made to television vertical and horizontal sync signals. In the United States and certain foreign countries, the field frequency for monochrome (black and white) is 30 Hz and for NTSC color is 29.94 Hz; the monochrome horizontal frequency is 15,750 Hz and the color horizontal frequency is 15,734.26 Hz. In the remainder of the world a 625 line, 25 Hz system is prevalent. There are two major color encoding systems used in such systems: PAL and SECAM. In such systems the vertical frequency is 25 Hz and the horizontal frequency is 15,625 Hz. It is to be understood that the present invention is equally applicable to all major frequency and color standards.

FIG. 15 will be understood better in conjunction with the waveforms shown in FIGS. 16 and 17.

Initially, ignore miscount blocks 150, 152 and logic block 154. Assume that the input and output lines of miscount blocks 150 and 152 are connected together. Thus a portion of the circuit becomes a conventional phase locked loop that locks the control variable A (block 156) in frequency and phase lock with references A (block 158). Thus reference A and control variable A are both at frequency $f_1$, phase $\phi$.

The reference A signal (FIG. 16A) from the reference A block 158, a square wave at frequency $f_1$, phase $\phi$, is applied to one input of a velocity phase detector 160 and to a sample pulse generator 162. The control variable A signal from control variable A block 156, which is also at frequency $f_1$, phase $\phi$, when the loop is locked is applied to a second input of the velocity phase detector 160.

The velocity phase detector 160 is also known in the art as a forward/backward or up/down counter. It provides one of three outputs: high if the reference pulse rate (frequency) is higher than the control variable pulse rate; low if the reference pulse rate is lower; and a toggle (FIG. 16E) (alternate high and low) output if the rates are the same. The toggling duty cycle depends on the phase of the reference and control variable: one causes the velocity phase detector to rise and the other causes it to fall.

The velocity phase detector 160 output drives a ramp generator contained in the sample pulse generator 162. A ramp (FIG. 16C) is initiated by the rising part of each detector output pulse, this being coincident with the control variable edge (FIG. 16E). The ramp is sampled by a pulse (FIG. 16B) generated by the trailing edge of the reference A pulse (FIG. 16A). The ramp (FIG. 16C) is stopped during the sample so that a DC level is produced having no carrier frequency component. The nominal frequency of the control variable A and the reference signal A is the carrier frequency of the loop. Conventional loop compensation in block 164 is provided to achieve the desired loop bandwidth, damping, etc.

Now suppose there is a third signal, reference B, provided by block 166, directly related to the reference A signal (as by a divider, for example: reference B at a lower frequency) and there is also a fourth signal, control variable B, provided by block 168, that is directly related to control variable A (as by a divider, for example, control variable B at a lower frequency). It follows that the reference B signal (from block 166) and the control variable B signal (from block 168) are in frequency lock if the phase locked loop is in lock, but they are not necessarily in phase lock since there are numerous positions at which the higher frequency signals (reference A and control variable A) can be in phase lock without the lower frequency signals (reference B, control variable B) being in phase lock. This effect is shown in FIG. 17 where the reference A pulses 170 are in frequency and phase lock with the control variable A pulses 172. Likewise, the reference B pulses 174 are in frequency lock (although at a lower frequency) and phase lock with the reference A pulses 170. Pulses 170 and 174 are directly related to each other and move together. On the other hand, the control variable B pulses 176 are also in frequency lock (although at a lower frequency) and phase lock with the control variable A pulses 172.

However, it will be noted that while the reference B pulses 174 and control variable B pulses 176 are in frequency lock they are not in phase lock in this example. There are five phases of pulses 170 and 172 that the pulses 174 and 176 can lock onto, hence, only by pure chance will pulses 174 and 176 be in phase lock with each other. The ultimate purpose of the circuit, therefore, is to phase lock control variable B (pulses 176) to reference B (pulses 174). As will be explained, this is accomplished by "ratcheting" pulses 172 relative to pulses 170 in the main phase locked loop until the pulses 176 (which follow pulses 172) have "stepped" over into phase lock with pulses 174. Thus in the example of FIG. 16, the pulses 176 step incrementally to position 176′ and to 176″ where phase lock is achieved.

In order to achieve the required correction, the control variable A must either be speeded up or slowed down for a short period of time. In accordance with the invention, the frequency of the control variable A is changed in incremental steps which results in a movement of $2\pi$ radians phase (of the loop carrier frequency). This is done by sequentially removing one or more pulses (i.e., "miscounting") from the control variable A or from the reference A signals that are applied to the velocity phase detector 160 until the reference B and control variable B signals are in phase lock. As a pulse is removed, the phase locked loop goes out of lock and a predictable amount of time is required for the loop to relock in frequency and then in phase. This time is less than the time between reference B pulses and the frequency of reference B must be smaller than about one-fifth to one-tenth of the reference A frequency. Pulses may be removed at any desired rate (the control rate) up to a rate equal to the frequency of reference B. If desired, a pulse could be removed only once a day (or month, etc.), however, this would make the time for resolving the error rather long. After the phase locked loop relocks following a pulse removal, the logic circuit 154 looks at reference B and control variable B to see if they are in phase lock. If not, it again removes a pulse. If the shortest direction for correction requires increasing the control variable A frequency, instead of slowing it down, then a pulse is removed inside the loop by miscount block 152. It will be noted that the reference signals are used as a time reference to gate out the control variable pulses and vice-versa.

Referring now particularly to FIGS. 15 and 16, the phase locked position of control variable B is shown at FIG. 16N. FIGS. 16J and 16L show reference B. If control variable B is phased as shown in FIG. 16K, then it should move to the left to resolve the error: it must speed up. In order to speed up the control variable A, a pulse is removed from the loop by the miscount block 152 gating out one of the control variable A pulses 172. The logic block 154 provides a gate signal (FIG. 16F) to block 152. The velocity phase detector 160 then goes high because the reference A signal rate is higher than the control variable A signal. The DC level (FIG. 16G) out of the ramp generator in sample pulse generator 162 rises causing the control variable to speed up. The loop then relocks, first in frequency, then in phase and the control variable A signals have shifted $2\pi$ radians of the carrier frequency. In the same manner the error can be resolved in the other direction by the logic 154 providing a gate signal (FIG. 16H) to miscount block 150 in order to remove a pulse from reference signal A. Logic block 154 may take many forms and its design is well within the skill of an ordinary artisan in the art given the teachings herein of desired function.

As explained further hereinafter, one application of the circuit of FIG. 15 is in a video tape recorder. Reference A can be the horizontal sync reference signals and reference B can be the vertical sync reference signals.

The control variable A, which can be a videotape scanner carrying the video playback heads can be in phase lock with the reference horizontal signals and yet the scanner might not be in phase lock with the reference vertical. In other words, the problem is to orient the video heads so that they are in a desired position when the reference vertical occurs. In effect, phase locking to the horizontal reference can get the scanner to the correct speed, but its relative position with respect to reference vertical can take many positions. By using the "miscount" or pulse dropping technique of the circuit of FIG. 15, the scanner takes discrete steps until it is locked with the reference vertical.

Figure 18A:
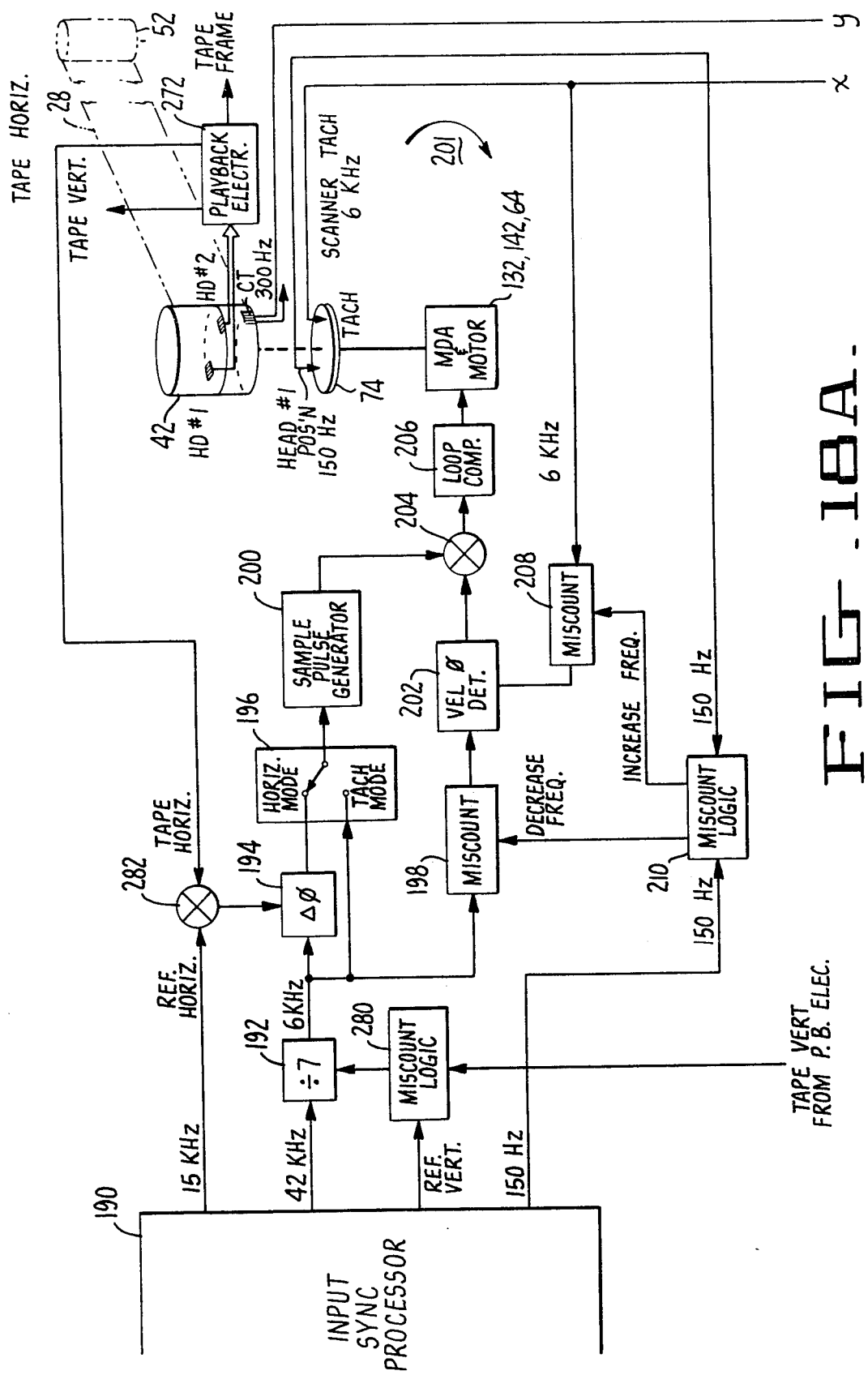
FIGS. 18A and 18B are a block diagram of a scanner and capstan servo systems of a video tape recorder according to the present invention.
Figure 18B:
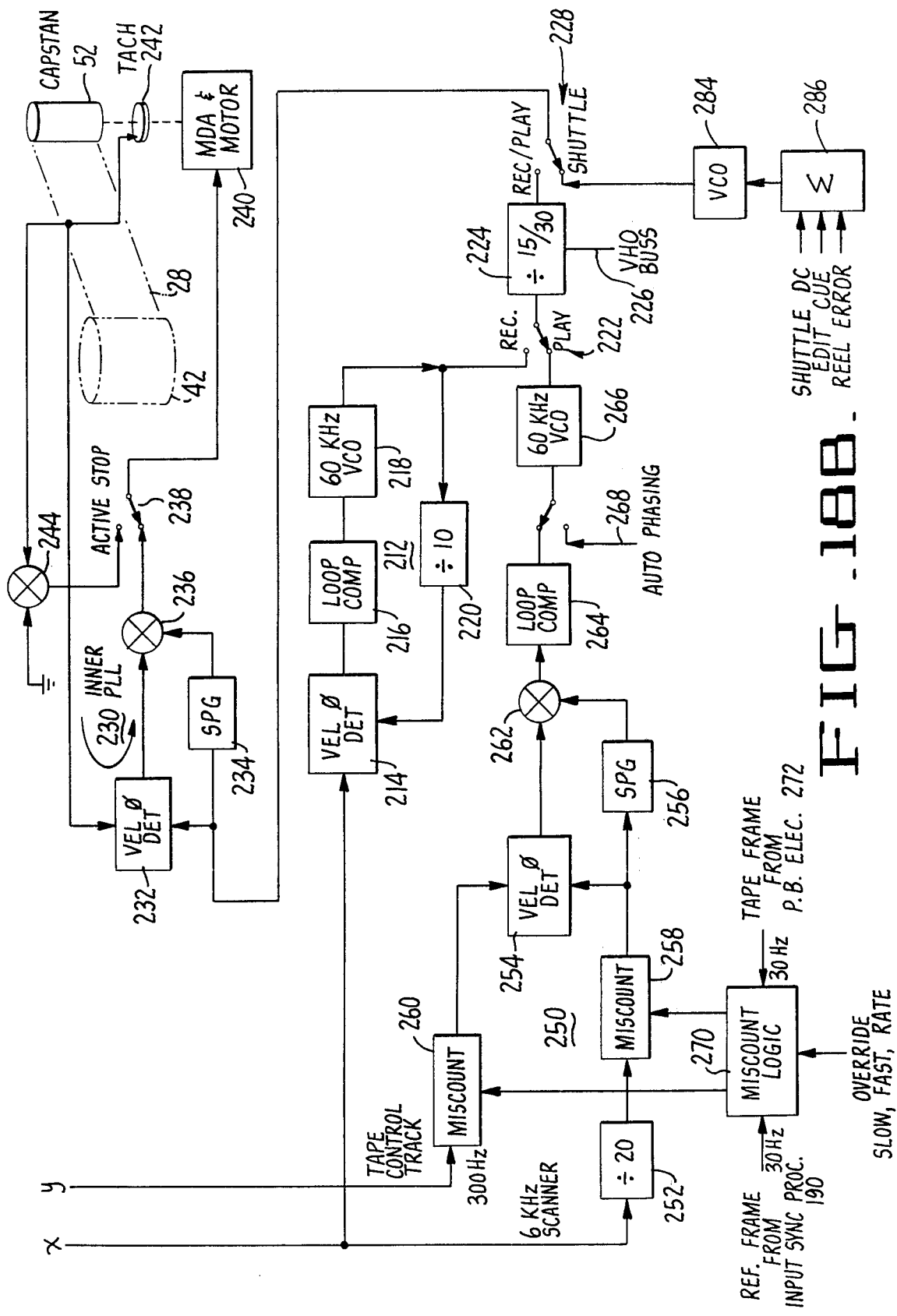

Referring now to FIG. 18 wherein a block diagram of the scanner and servo systems of a video tape recorder are shown. It will be seen that the "miscount" phasing system of FIG. 15 forms a portion of the system of FIG. 18.

Before describing FIG. 18 in detail, it will aid the understanding of the circuit to briefly explain the intended function of the circuit. Generally speaking, in broadcast studio use it is desirable to maintain the video tape recorder in frequency and phase lock with the studio reference vertical and horizontal signals during both record and playback so that switching between the recorder and other sources may be made without loss of synchronism. Thus, the scanner carrying the video heads is usually kept in frequency and phase lock with the studio reference signals. In recording, the capstan is in turn frequency and phase locked to the scanner. The scanner provides a control track signal recorded on the tape for use in duplicating the record conditions during playback by compensating for slightly varying dimensional tolerances in the capstan and scanner when the tape is played on a different machine from that on which the recording is made. Also in record, the video head 2 is oriented so that the reference frame pulse is recorded in a predetermined recording track area.

In playback, the scanner is also locked to the studio reference signals. The capstan is brought to a speed so that the longitudinal tape speed is substantially identical to the speed at which the tape was recorded by comparing the control track signal to the scanner speed. The scanner is incrementally rotated until the video head 2 is oriented correctly with the reference frame pulse and the capstan moves the tape incrementally so that the tape vertical and reference vertical are nearly in phase lock. The scanner is then rotated incrementally to resolve any remaining phase error between reference and tape vertical. Then, in the fully synchronous mode, the tape horizontal and reference horizontal are resolved.

As shown in FIG. 18, an input sync processor 190, the details of which are the subject of a copending application of Bert H. Dann and Nikola Vidovic, entitled Synchronizing Pulse Processor for a Video Tape Recorder, Ser. No. 285,919, filed Sept. 1, 1972 and assigned to the same assignee as this application, provides a set of reference signals at the horizontal sync rate, at 42 KHz, at the vertical sync rate, and at 150 Hz. These signals may be derived from the studio horizontal and vertical sync signals, but may be advanced in the sync processor in order to account for delays in the recorder circuitry.

First, referring to the circuitry for frequency and phase locking the scanner to the sync processor 190, the 42 KHz signal is applied to a divide by 7 counter 192 to provide a 6 KHz signal. The 6 KHz signal is applied to a vernier phase adjusting circuit 194 that has its output connected to one input of a single pole double throw switch 196 that places the circuit in the horizontal mode (fully synchronous) or tach mode (VTR only locked to vertical). The 6 KHz signal is also applied to the other half of switch 196 and to the input of miscount gate 198.

Switch 196 has its output connected to one input of sample pulse generator 200. Miscount gate 198 has its output connected to one input of velocity phase detector 202. The output of detector 202 is applied to a conventional phase detector 204. A phase locked loop 201 is formed including the velocity phase detector 202, phase detector 204, a conventional loop compensating network 206, the scanner motor drive amplifiers 132, 142 and motor 64, the scanner tachometer 6 KHz signal and a further miscount gate 208. Detector 202, compensation network 206, and miscount gate 208 function as in FIG. 14.

Assume initially that switch 196 is in the tach mode position and miscount gates 198 and 208 provide direct connections between their inputs and outputs, then the phase lock loop will lock the 6 KHz scanner tach signal to the divided down 6 KHz reference signal thereby frequency and phase locking the scanner rotation to the reference signal.

In order to orient head 2 on the scanner relative to the reference frame the 150 Hz head 1 pulse is compared in miscount logic block 210 to a 150 Hz related to the reference frame from the processor 190. This operation is comparable to the phasing of the control variable B in FIG. 15. Depending on the direction of error a gating signal is applied either to miscount gate 198 to remove a pulse from the signals applied to the phase lock loop, thereby decreasing the loop frequency momentarily, or to miscount gate 208 to remove a pulse from the signals within the phase lock loop, thereby increasing the loop frequency momentarily.

In the record mode the 6KHz scanner tachometer signal is applied to a phase locked loop 212 that provides a 60 KHz output signal. Loop 212 includes a velocity phase detector 214, a loop compensating network 216, a 60 KHz VCO 218, and a divide by ten counter 220. The VCO 218 provides a 60 KHz signal phase locked to the 6 KHz scanner tachometer signal to one terminal of a single pole double throw switch 222 which, in the record mode, is connected to a divide by 15 of divide by 30 divider 224. Divider 224 is controlled by VHO buss line 226 so as to provide either a 4 KHz or 2 KHz output signal to one terminal of a further single pole throw switch 228 which, in record or play, connects the signal to a further phase locked loop 230 that includes the capstan motor drive. Loop 230 receives the signal from switch 228 at a velocity phase detector 232 and a sampling pulse gate 234. The detector 232 output and the gate 234 output are applied to inputs of phase comparator 236. A switch 238 selects the comparator 236 output except in the active stop mode where a positive stop condition of the capstan is desired. Switch 238 is connected to the capstan motor drive amplifier and motor 240, described in greater detail in connection with FIGS. 19, 20 and 21, hereinafter. A tachometer disc 242 mounted on the capstan drive shaft provides 1500 Hz pulses at normal running speed. The tach signal is applied to the other input of the detector 232. In the active stop mode switch 238 connects the output of phase comparator 244 to the MDA and motor 240. Comparator 244 compares the tach signal to ground and thus tends to hold the capstan motionless except when enough force is applied to overcome the loop. The active stop loop is described further below in conjunction with FIGS. 24A, B and C.

Thus, in the record mode, the capstan is phase locked to the scanner via loops 212 and 230.

In the playback mode, switch 222 is disconnected from loop 212 so that the capstan is not directly locked to the scanner. This is significant in obtaining proper playback since any mechanical differences between the recorder on which the tape is made and on which it is played back must be taken into account.

The 6 KHz scanner tack signal and the 300 Hz tape control track signal are compared in a phase locked loop portion 250. The 6 KHz signal is applied to a divide by 20 counter 252 to provide a 300 KHz signal which is connected to an input of velocity phase detector 254 and sample pulse gate 256 through miscount gate 258. The 300 Hz control track signal is applied to the other input of detector 254 through miscount gate 260. The gate 256 and detector 254 outputs are applied to phase comparator 262, the output of which is applied to loop compensation network 264. A 60 KHz VCO 266 either receives the network 264 output or an auto phasing signal on line 268. The loop of which portion 250 forms a part is completed by the connections to loop 230, the capstan 52 and the tape 28.

In order to "frame" the capstan, the miscount logic block 270 compares the 30 Hz reference frame signal from processor 190 with the 30 Hz tape frame signal from the playback electronics 272. Electronics 272 receive the signals from the two video heads and provide tape vertical, tape frame and tape horizontal signals. In a similar manner as described above in connection with other loops, logic 270 controls miscount gates 258 and 260 to cause the tape to move incrementally until the tape frame and reference frame signals are in phase lock. However, due to slight mechanical variations this phase locking does not typically result in a perfect phase lock, but rather gets head 2 on the correct tape video track.

To achieve complete vertical lock up, the tape vertical signals from the playback electronics 272 are compared to the reference vertical signals in a miscount logic block 200. The logic 280 adds or removes pulses in divider 192 from the divided 42 KHz signals to cause loop 201 to incrementally move the scanner to achieve complete vertical phase lock.

Typically such lock results in a horizontal error of less than one-half line. To resolve the remaining horizontal error, switch 196 is connected to the horizontal mode position so that the 6 KHz signals from divider 192 may be shifted slightly under the control of a comparator 282 which receives the tape horizontal and reference horizontal signals.

Referring again to the capstan portion of the circuit, when the switch 228 is connected to the "shuttle" position, a DC signal from VCO 284 and summer 286 controls the speed and direction of capstan 52. It will be noted that the capstan servo comprises a basic inner loop 230 including velocity phase detector 232 and the MDA and permanent magnet DC motor 240. This loop is closed as a phase locked loop of Type 1, i.e., it has a transfer characteristic $$G(s)H(s) = \frac{K}{s(s+a)}$$

and will provide phase correspondence between the tach 242 frequency and the reference frequency from VCO 284 as determined by the open loop gain. The loop configuration effectively converts the capstan motor from a DC motor to a synchronous type motor of which the speed is determined by the applied reference frequency. The phase locked inner loop is used even in the shuttle mode of operation unlike typical prior art systems which use velocity type servos in such cases where a wide range in operating speed is required. Such prior art velocity type servos, however, cannot resolve speeds tending to zero and hence minimum prior art shuttle speeds have been close to play speed. By optimizing the loop 230 at play speed it is possible to run at 10% of play speed with good resolution thus permitting more accurate parking of the tape when cueing to a particular tape address. Also, since the loop operates as a phase locked loop all finite errors are in terms of phase only; there is zero frequency error within the designed operating range.

Figure 19:
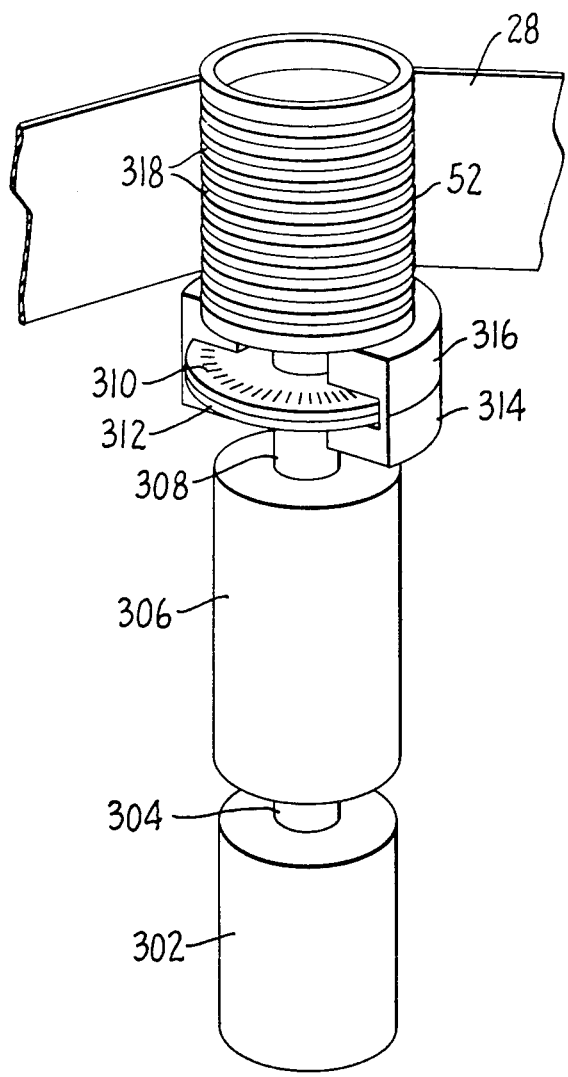
FIG. 19 is a partially cut-away perspective view of the capstan assembly.
Figure 20:
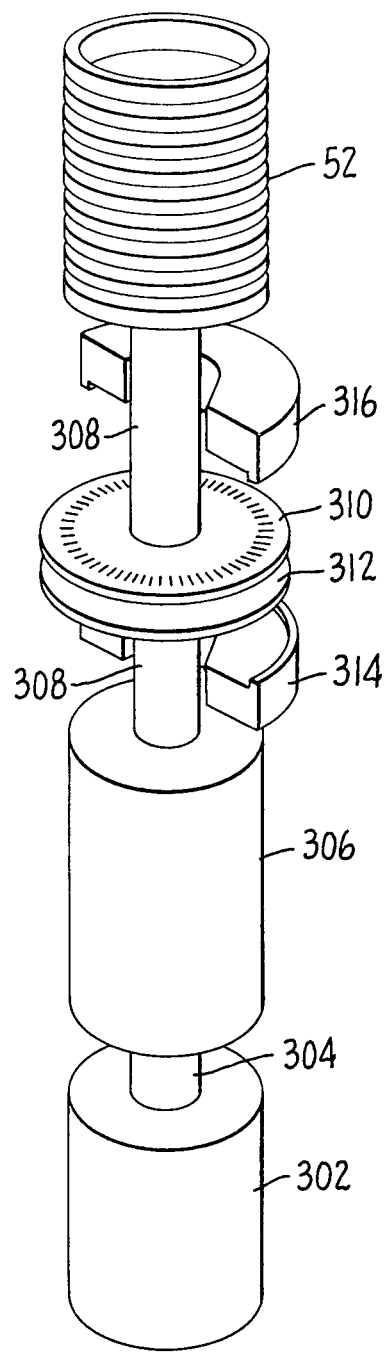
FIG. 20 is an exploded view of FIG. 19.

FIGS. 19 and 20 show details of the capstan assembly. A motor 302 drives a lower drive shaft 304 that is coupled to a bearing assembly 306. Mechanical details not necessary to a full disclosure and understanding of the invention are omitted. An upper drive shaft 308 couples to the bearing assembly 306 to the capstan 52. The capstan 52, a cylindrical member, has vertical grooves 315 to eliminate any air bearing effect and to enhance the capstan to tape contact friction. A rotating optical disc 310 is fixed to shaft 308 in juxtaposition to a lower fixed (non-rotating) optical disc 312. A light source holder 314, similar to the capstan light source holder 84, is fixed in position below disc 312 and a light sensor holder 316, similar to capstan light sensor 72, is fixed in position above disc 310.

Although it may be of many types, in one working embodiment, the motor 302 is a permanent magnet DC printed circuit motor. FIG. 21 shows a plot of speed in RPM versus torque in oz-in for a typical motor of such type. The relationship of speed to voltage of such a motor is particularly advantageous when used in the circuit of FIG. 18.

FIGS. 22A and 22B show the rotating optical disc 310 in greater detail. The disc is circular having a central cut-out portion 320 for attachment to the shaft 308. The disc is opaque except for a series of 1,500 clear or cut-out areas 322 equally spaced circumferentially between two radial distances. Areas 322 are shown in FIG. 22B.

FIGS. 23A, 23B and 23C depict the fixed, nonrotating disc 312 in detail. A central aperture 324 is provided for mounting the disc. Three clear or cut-out pattern areas are located to be congruent radially with the slots 322 of rotating disc 310. The 0° pattern area 323 has slots 325 congruent with slots 322; the 90° pattern area 326 has slots 327 shifted a half slot width with respect to the 0° pattern slots 325; and the 180° pattern area 328 has slots 330 shifted a full slot width (i.e., completely overlapping) with the 0° pattern slots 325. Thus, the photosensors and detectors located adjacent areas 324, 326 and 328 can provide a 1,500 line tach output from the 0° pattern area 324, a 3,000 line (double frequency) tach output from the sum of the 0° pattern area 324 and the 180° pattern area 328.

Also, by processing the 0° pattern area 324 signals and the 90° pattern area 326 signals, the direction of rotation is indicated. Circuitry for processing such tachometer signals is conventional in the art.

Figure 24A:
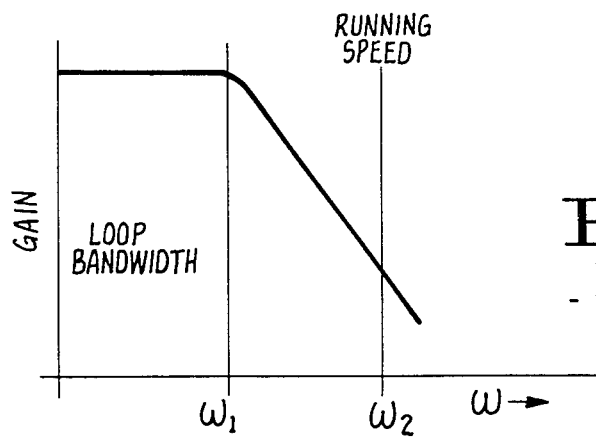
FIG. 24A is a graph of the active stop loop bandwith.

Referring now to further details of the capstan active stop loop mentioned above in connection with FIG. 18. The loop bandwidth is shown in FIG. 24A. The nominal running speed $W_2$ is so far down the skirt of the loop bandwidth curve that there is inadequate gain to stop the capstan when the loop 230 is placed in the active stop position, hence an additional voltage must be provided to move the capstan speed toward zero where the loop gain is adequate to bring the capstan to a rapid stop.

Figure 24B:
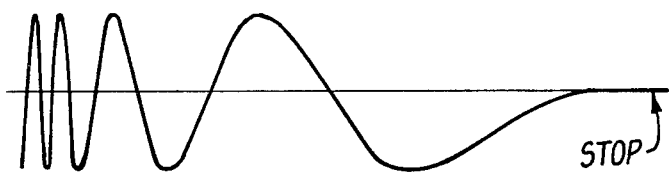
FIG. 24B is a graph of the active stop loop error voltage as it approaches a stopped condition.

The photo transistors in member 316 (FIG. 20) provide a linear output between minimum and maximum light transmission from the tach discs 310, 312. If the disc contains N lines then the capstan could come to an active stop in any of N positions spaced by ($2\pi/N$) radians of the capstan. As can be seen from the error trace of FIG. 24B the error voltage is equal to RPS (the disc speed in revolutions per second) times N Hz.

Figure 24C:
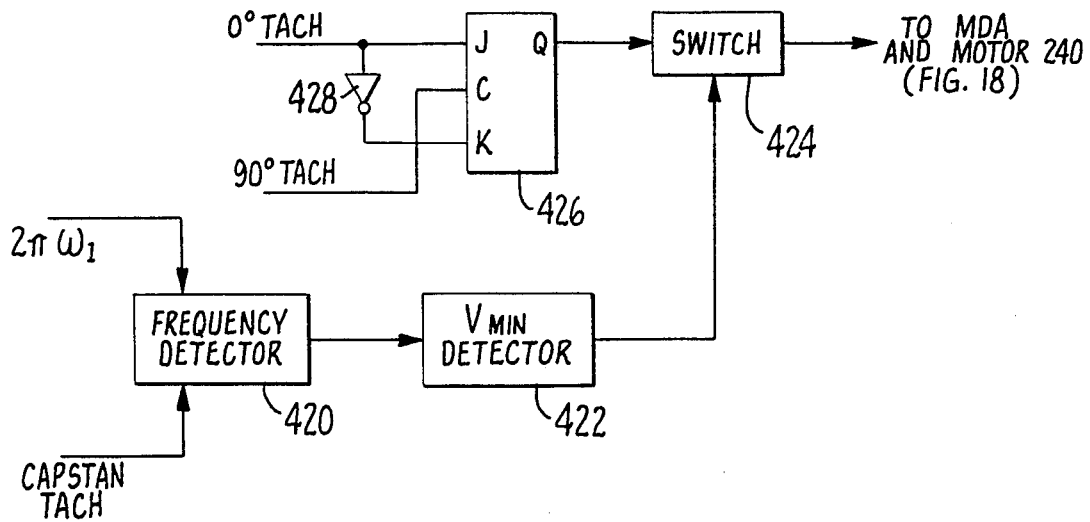
FIG. 24C is a block diagram of a circuit used in conjunction with the active stop loop.

In order to provide the required pull in, the circuit of FIG. 24C is provided. The capstan tach frequency is compared to a frequency $2\pi W_1$, at which the loop gain is adequate for pull in, in a frequency detector 420 which provides a voltage proportional to the relationship of the two frequencies. A low voltage, $V_{min}$, indicates that the capstan frequency is above the reference frequency. A $V_{min}$ detector 422 looks at the voltage from detector 420 and if it is below $V_{min}$ it closes switch 424 thus connecting the output of JK flip-flop 426 to the MDA and motor 240 which thereby adds a voltage to the MDA input adequate to drive the capstan toward zero speed. The JK flip-flop 426 J and K inputs are taken from the tach disc 312 0° signal directly and through an inverter 428 respectively. The 90° tach disc 312 signals are applied to the clock input. The resulting Q output provides a voltage of one polarity for one direction of capstan rotation and the other polarity for the reverse.

FIG. 25A shows in block diagram form a tension servo system usable with the VTR disclosed in this application. The off-tape horizontal sync signals are applied to an automatic frequency control (AFC) circuit 340 which provides a horizontal error output signal on line 341 (FIG. 25). The AFC 340 comprises a conventional phase locked loop 342 having a bandwidth of about one-tenth the head switching rate. Thus, due to the fly-wheel effect of the loop, any departures in the horizontal off-tape input frequency generate a tension error signal at the output of the loop phase comparator 344 (FIG. 25B). The loop 342 includes conventional elements including a loop compensation circuit 346, a voltage controlled oscillator 348 (VCO) at the nominal horizontal frequency and a ramp generator 350.

The VCO 348 output is also applied to the head switching logic 352. Details of the head switching logic are disclosed in the aforementioned copending application of Barrett E. Guisinger, entitled Helical Scan Wide Band Tape Recorder Apparatus and Method. For the purposes of this application, it is sufficient to state that the two video heads must be alternately activated during playback in accordance with a waveform of the type shown in FIG. 25C. Logic 352 also receives the Head No. 1 pulse signal, the 300 Hz signal from the scanner disc and the tape frame signal.

The 300 Hz scanner disc signal provides a series of pulses (FIG. 25B) occurring just prior to each head switch transition. These are applied to a first sampler 354 and the logic 352 provides a series of pulses (FIG. 25B) occurring just after each head switch transition. The latter pulses are applied to a second sampler 356. The samplers 354 and 356 receive the tension error signal, which is a sawtooth type wave reaching its maximum peak to peak value at the head switch (FIG. 25B), via an amplifier 358, and thus provide outputs to a pair of memory capacitors 360 and 362 which store, respectively, the error values just before and just after the head switches. The DC errors stored in capacitors 360 and 362 are amplified by operational amplifiers 364 and 366 respectively and subtracted by amplifier 368 to provide a voltage at junction 370 representing a DC value proportional to the peak to peak tension error across the scanner. By looking twice and obtaining a difference value, common mode errors are eliminated.

The voltage at junction 370, which is updated at every head switch, is applied to a preamplifier 372 (an operational amplifier with feedback resistor 373) and to a motor drive amplifier (MDA) 374 which drives a valve 376 that varies the vacuum to vacuum columns 30 and 32 in response to the voltage charge. The valve 376 may be activated, for example, by a DC motor or the equivalent (not shown). Details of the valve 376 are disclosed in the aforementioned continuation-in-part of said Ser. No. 285,923 application.

During threading, shuttle or stop modes certain fixed tensions are provided by applying predetermined voltages to amplifier 372. For example, a threading voltage is applied by an FET switch 408 through resistor 402, a shuttle voltage by FET switch 410 through resistor 404 and a stop voltage through FET switch 412 and resistor 406. A logic control 414 activates the correct switch 408, 410 or 412 in accordance with the machine mode.

During recording, the FET switch 378 is closed thus grounding the amplifier 372 input (FET switch 379 is normally closed), thus providing a fixed record tension. During electronic editing modes where it is undesirable to rapidly change the tension at transitions from playback to record, FET switch 379 is opened during the record sequence, thus retaining the last stored playback tension voltage value in memory capacitor 414.

A modification to the circuit of FIG. 25A is shown in FIG. 26. During edit record modes of operation the voltage on capacitor 414, which is intended to accurately retain the voltage representing the playback tension, my drift from its initial value during long record segments. Thus the modification of FIG. 26 provides an alternative means for holding the playback tension voltage error during edit record modes of VTR operation. The FET 379 and capacitor 414 (FIG. 25A) have been removed and a comparator, an up-down counter and a ladder network arrangement have been inserted. This new arrangement passes the input DC tension error voltage at junction 370 to operational amplifier 372 after an A/D and D/A conversion. In the edit record mode, the clock strobe signal is stopped by record/play edit logic in order that the analog output applied to amplifier 372 remains at the last playback tension error value. Because the analog output is derived from the value stored in the up-down counter it remains highly stable for any desired time period.

Referring to the details of FIG. 26, the DC tension error voltage at junction 370 is applied to the negative input of a comparator 562 through input resistor 560. As will be explained below, the positive input of comparator 562 receives the analog output of the A/D and D/A conversions. The output of comparator 562 is applied directly to the J input of J-K flip flop 564 and through an inverter 566 to the flip flop K input. The flip flop 564 Q output is connected to one input of NAND gate 574 and its $\bar{Q}$ output is applied to one input of NAND gate 572.

A clock signal at 42KHz, for example, is applied to one input NAND gate 568. The clock signal rate is not critical and can assume a wide range of values. The other input of gate 568 is controlled by record/play edit logic 380 so that gate 568 provides no clock output during the edit record mode so that the last playback tension error is maintained. The output of gate 568 is applied to the clock pulse ($C_p$) input of flip flop 564 and the gate 568 output is applied to inverter 570 so that the other phase of the clock signal is applied to the other inputs of gates 572 and 574.

In operation the output of gate 572 provides an up-count at each clock pulse when the fed back analog signal (at the comparator positive input) from the A/D and D/A output is higher than the DC tension error input signal (at the comparator negative input). Thus, up/down counter 576 counts up on consecutive clock pulses so long as the feed back voltage level exceeds in input level; counter 576 counts down when the fed back drops below the input level. The result is that the digital value in counter 576 and consequently the decoded analog value from D/A converter 578 follow the DC error input signal and when the clock pulses are stopped the digital value and resulting analog output is retained at the last clocked input value.

Counter 576 may have an 8-bit capacity, for example, which would require eight parallel lines 577 from counter 576 to D/A converter 578. Converter 578 may be a conventional ladder network, for example. In this environment, the D/A converter 578 need not be highly accurate but instead its resolution and stability are of greatest importance. That is, it is not significant that the analog ouput of converter 578 provide an accurate decoding of the digital value on lines 577 but rather that it resolve the digital values and retain the resulting analog value so long as the same digital input is present.

The analog output of converter 578 is inverted by operational amplifier 582 and is applied to the positive input of comparator 562. Amplifier 582 receives the converter 578 output through an input resistor 580 to its negative input. The positive input is referenced to ground through resistor 586. A conventional feedback resistor 584 is connected between the amplifier 582 output and its negative input.

The analog signal representative of the input DC analog signal is applied to amplifier 372 (see FIG. 25A).

In operation during a playback mode ("play" or "edit play") the analog output from network 578 is proportional to the DC error voltage at junction 370. The clock strobe rate is sufficiently high enough that a change in the DC voltage at junction 370 is substantially instantaneous. When the "edit record" mode is entered it is desired to retain the last DC error voltage so that the same tension is maintained. Hence, logic 380 controls gate 568 so that the clock is stopped and the count in up/down counter 576 is held unchanged thus causing the decoded analog ouput from converter 578 to remain unchanged at the last playback tension error value. Other arrangements for accurately holding the playback DC error voltage will occur to those of ordinary skill in this art in view of these teachings.

Figure 27:
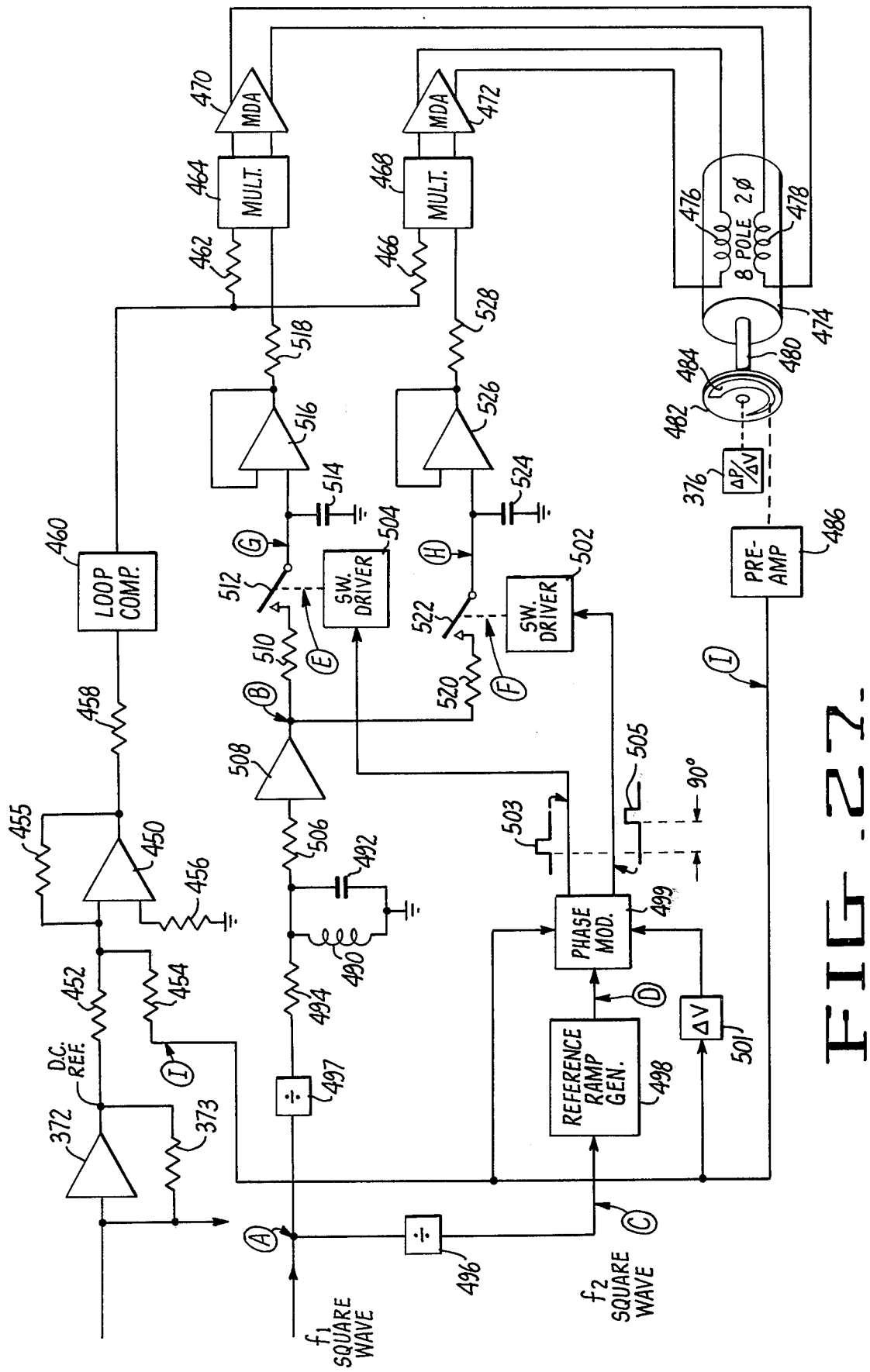
FIG. 27 is a block diagram of an alternative embodiment of the brushless DC motor drive according to the present invention.

An alternative to the brushless DC motor drive of FIG. 10 is shown in FIG. 27. The motor drive circuit of FIG. 27 derives the sine/cosine drive signals electronically and, in addition, provides position information so that the motor can be used in a closed loop position servo arrangement which is not possible in the FIG. 10 arrangement. As explained further herein and in conjunction with FIG. 29, position, sine, cosine and digital information can all be derived from a single device providing an indication of the motor shaft rotational position. Thus, this alternative drive circuit can be used with the scanner motor 64.

Referring now to the details of FIG. 27 along with the accompanying waveforms of FIG. 28A-I, the circuit is shown in a zero speed closed loop position servo for controlling the valve 376 of FIG. 25A in response to the DC voltage appearing at the output of amplifier 372 of that figure.

The DC voltage from amplifier 372 provides the reference voltage to the circuit for controlling the DC motor 474 position and thereby controlling the valve 376 position. The DC reference voltage is summed at summing amplifier 450 through summing resistor 452 with a voltage indicative of the motor 474 shaft angular position applied through summing resistor 454. Amplifier 450 is a conventional operational amplifier with its inverting input referenced to ground through resistor 456 and having a feedback resistor 455. As will become apparent, amplifier 450 is inside a position servo loop closed around motor 474 and the amplifier 450 output is applied to a conventional loop compensation circuit 460 through resistor 458. The block 460 output thus provides a loop error signal to the summing four quadrant multipliers 464 and 468 through input resistors 462 and 466, respectively. The error signal modulates the amplitude and phase of the sine and cosine drive signals which are also applied to multipliers 464 and 468, respectively, as is explained below.

Figure 28:
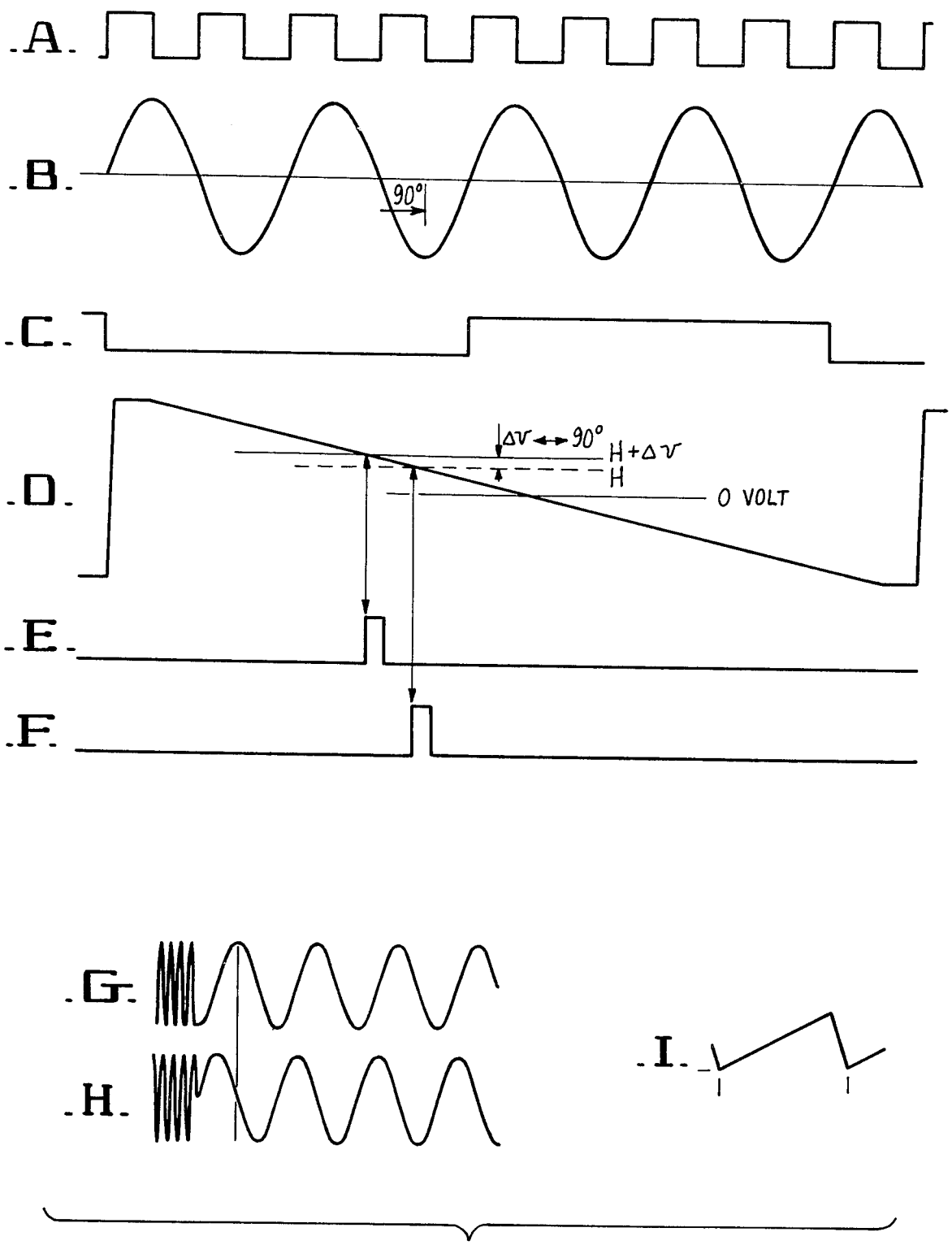
FIG. 28A-H is a series of waveforms useful in understanding FIG. 27.

A reference square wave signal at frequency $f_1$ (FIG. 28A), which is approximately 40 times the maximum rotational rate of motor 474, 42KHz, for example, is used as a source from which the sine and cosine drive signals are derived after proper conditioning. The $f_1$ reference signal is divided by two, for example, in divider 497 and the resulting 21KHz square wave is applied through a coupling resistor 494 to a circuit 488 which is resonant at $f_1/2$ to provide a sine wave at the same frequency (FIG. 28B). Circuit 488 includes a parallel inductor 490 and capacitor 492. The sine wave signal is applied to an amplifier 508 through resistor 506 where it is split into two paths: through resistor 510 to switch 512 and through resistor 520 to switch 522.

The $f_1$ square wave reference signal is also applied to a divider 596 which divides $f_1$ by at least a factor of 8 and preferably by a factor of 10 to 16, for example so that the ratio of $f_2$ to $f_1/2$ is adequate to provide a sufficiently high sampling rate. The divided $f_1$, referred to as $f_2$ (FIG. 28C), is applied to a reference ramp generator 498. Generator 498 generates a ramp (FIG. 28D) at each negative going cycle of $f_2$; the ramp has a period substantially equal to the complete period of $f_2$. The ramp is applied to a conventional phase modulator 499 which receives the motor angular position signal at one input and the same signal shifted by a fixed voltage $\Delta V$ through level shifter 501 at a second input. Modulator 499 can include a pair of comparators, for example, which compare the ramp to each of the voltage inputs to provide output pulses 503 (FIG. 28E) and 505 (FIG. 28F) that are 90° apart at the frequency of $f_1/2$. Thus the motor angular position signal samples the ramp at two places to provide pulse outputs 503 and 505 that are fixed in phase relative to each other but which vary in absolute phase depending on the motor angular position. The output pulse 503 is applied to a switch driver 504 that controls switch 512 and the output pulse 505 is applied to a switch driver 502 that controls switch 522. Switches 512 and 522 are preferably fast acting electronic switches such as FET switches.

The $f_1/2$ sine wave applied to switches 512 and 522 is therefore sampled by the pulses 505 and 503 to provide discrete values representative of a sine wave and a cosine wave, respectively, at the frequency $f_2$. Capacitors 514 and 524 smooth out the discrete samples to provide the $f_2$ sine and cosine waves of FIGS. 28G and 28H (which are not drawn to the same time scale as the sine wave of FIG. 28B which is at $f_1/2$). The sine and cosine signals are applied to multipliers 464 and 468, respectively, through amplifiers 516, 526 and resistors 518, 528. Thus, a voltage from motor 474 representing its rotational position is used to electronically generate sine/cosine drive signals as in the circuit of FIG. 10 but without the requirement for the precise sinusoidal light transmission disc 74 associated with that motor drive. The sine/cosine drive signals can reverse their lead/lag relationship to move the motor in either direction.

The outputs of multipliers 464, 468 are applied to conventional motor drive amplifiers 470 and 472 which drive the two phases 476, 478 of the brushless DC 8 pole 2ϕ motor 474. The motor 474 drive shaft 480 has a disc 482 with a curved triangle-like light transparent area 484 which can be used with a light source and sensor (not shown) to provide a DC signal which depends on the shaft 480 rotational position. The DC signal drives a preamplifier 486, which has conventional zeroing adjustments for providing a normalized output. Alternatively, any other means for providing a signal which varies with respect to the motor shaft 480 rotational position may be used, for example, a variable resistor connected to a voltage source.

The DC signal representing the position of motor 474 is shown in FIG. 28I. Desirably the signal is linear over a substantial part of the 360° rotation. A short retrace time is, of course, required and results in a few cycles of sine and cosine signal at a multiple of $f_2$ during the retrace (FIGS. 28G, H). In a zero speed position loop arrangement as described, the system is arranged so that the retrace is not encountered. In a velocity loop arrangement, such as if the drive arrangement of FIG. 26 were substituted for the scanner drive of FIG. 10, it has been found that the accuracy of the motor velocity is unaffected by the brief aberration during retrace due to the inertia of the motor.

The single signal from disc 482 thus is adequate to provide both position information to amplifier 450 for use in the position servo loop and sine/cosine drive information in proper relation to the pole position of the rotor of motor 474.

Figure 29:
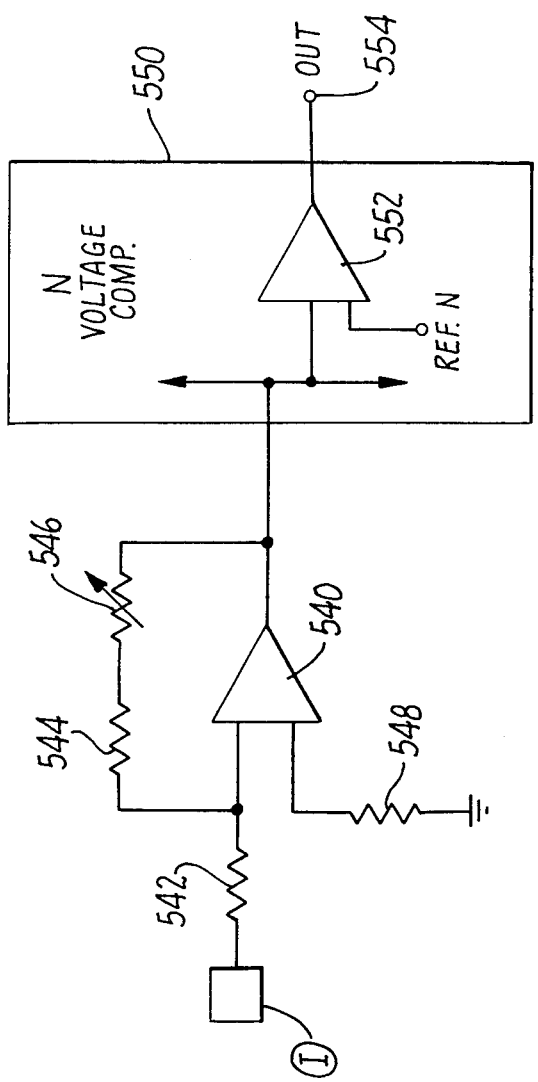
FIG. 29 is a partially block schematic diagram showing a modification of FIG. 27 for deriving digital information.

It is also possible to derive digital information from the single signal of disc 482 by the approach shown in FIG. 29. The signal from motor 474 (FIG. 28I) is applied to an operational amplifier through input resistor 542 with a gain control by variable resistor 546 in the feedback loop in series with resistor 544. The inverting input of the amplifier 540 is referenced to ground through resistor 548. The amplifier 540 output is applied to a bank of N comparators 550. Each comparator 552 is referenced to an appropriate voltage reference N. Thus there is provided at a plurality of outputs 554 a digital signal representing the angular position of the motor shaft 480. The sample rate is N times the motor rotational rate.

I claim:

1. A drive system for an N-pole brushless DC motor comprising
   means for providing N sine wave and N cosine wave cycles in response to every motor revolution, said waves representing the mechanical pole positions of the motor, said means including means for generating a signal representing the angular position of the drive shaft of said motor and means for generating said sine wave and cosine wave cycles in response to said signal, and
   drive current means modulated by said sine and cosine waves for driving the respective motor phases of said motor with a continuous driving signal following said sine and cosine waves.

2. The combination of claim 1 further comprising means for generating a digital signal in response to said signal.

3. The combination of claim 1 further comprising means for comparing said angular position signal to a reference control signal to generate an error signal and means for multiplying said error signal times each of said sine and cosine wave cycles for controlling the angular rotational position of the drive shaft of said motor in response to said reference control signal.

* * * * *